United States Patent
Ryu et al.

(10) Patent No.: US 10,652,085 B2
(45) Date of Patent: May 12, 2020

(54) METHOD FOR SETTING CONFIGURATION OF NON-IP DATA DELIVERY (NDID) IN WIRELESS COMMUNICATION SYSTEM AND DEVICE FOR SAME

(71) Applicant: LG ELECTRONICS INC., Seoul (KR)

(72) Inventors: Jinsook Ryu, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/068,598

(22) PCT Filed: Jan. 9, 2017

(86) PCT No.: PCT/KR2017/000294
§ 371 (c)(1),
(2) Date: Jul. 6, 2018

(87) PCT Pub. No.: WO2017/119802
PCT Pub. Date: Jul. 13, 2017

(65) Prior Publication Data
US 2019/0028337 A1    Jan. 24, 2019

Related U.S. Application Data

(60) Provisional application No. 62/275,790, filed on Jan. 7, 2016.

(51) Int. Cl.
*H04L 12/24* (2006.01)
*H04W 8/02* (2009.01)
(Continued)

(52) U.S. Cl.
CPC ........... *H04L 41/0806* (2013.01); *H04W 4/70* (2018.02); *H04W 8/02* (2013.01); *H04W 8/20* (2013.01); *H04W 60/04* (2013.01)

(58) Field of Classification Search
CPC ........... H04W 8/02; H04W 4/70; H04W 8/20; H04L 41/0816
See application file for complete search history.

(56) References Cited

U.S. PATENT DOCUMENTS

2015/0264512 A1   9/2015  Jain et al.
2015/0365789 A1  12/2015  Salot et al.
(Continued)

OTHER PUBLICATIONS

Ericsson et al., "Introducing Support for Non-IP Data for CIoT", S2-153871, 3GFP TSG-SA WG2 Meeting #112, Anaheim, USA, Nov. 16-20, 2015, 7 pages.
(Continued)

*Primary Examiner* — Brian D Nguyen
(74) *Attorney, Agent, or Firm* — Birch, Stewart, Kolasch & Birch, LLP

(57) ABSTRACT

One aspect of the present invention relates to a method for setting, by an SCEF, and NIDD configuration in a wireless communication system, the method including: a step for receiving, from a network node, a first SCEF connection setup request for non-IP data transmission by a terminal, the first SCEF connection setup request including an external identifier of the terminal and a SCS/AS identifier of an SEC/AS for servicing the terminal; a step of determining whether the NIDD configuration with SCS/AS is established; a step for transmitting, to the SCS/AS, a second SCEF connection setup request for establishing the NIDD configuration, when the NIDD configuration is not established, the second SCEF connection setup request including the external identifier of the terminal; and a step for setting the NIDD configuration for the SCS/AS and the terminal.

15 Claims, 21 Drawing Sheets

(51) Int. Cl.
*H04W 8/20* (2009.01)
*H04W 4/70* (2018.01)
*H04W 60/04* (2009.01)

(56) References Cited

U.S. PATENT DOCUMENTS

| | | | |
|---|---|---|---|
| 2017/0251342 A1* | 8/2017 | Bhalla | H04W 4/08 |
| 2017/0339534 A1* | 11/2017 | Bhalla | H04W 84/04 |
| 2018/0227768 A1* | 8/2018 | Samdanis | H04W 16/14 |
| 2018/0332462 A1* | 11/2018 | Kim | H04W 8/02 |
| 2018/0352501 A1* | 12/2018 | Zhang | H04W 48/18 |

OTHER PUBLICATIONS

Neul, "Asynchronous Message Transport for non-IP devices", S2-154092, 3GPP TSG-SA WG2 Meeting #112, Anaheim, USA, Nov. 16-20, 2015, 7 pages.

Samsung et al., "Introduction of non-IP data delivery via the SCEF for cellular IoT", S2-154024, 3GFP TSG-SA WG2 Meeting #112, Anaheim, USA, Nov. 16-20, 2015, 9 pages.

\* cited by examiner

[Fig. 1]
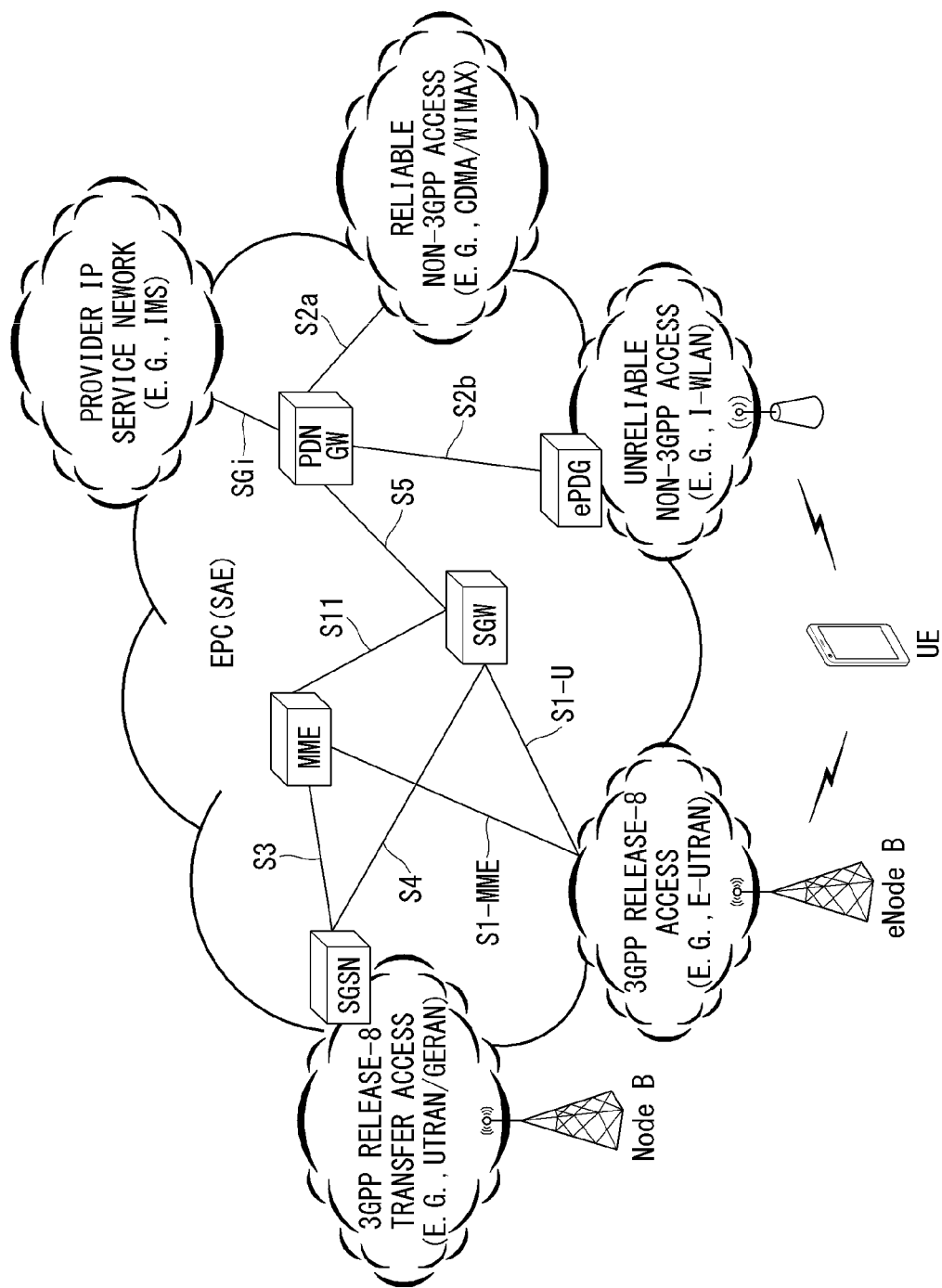

[Fig. 2]
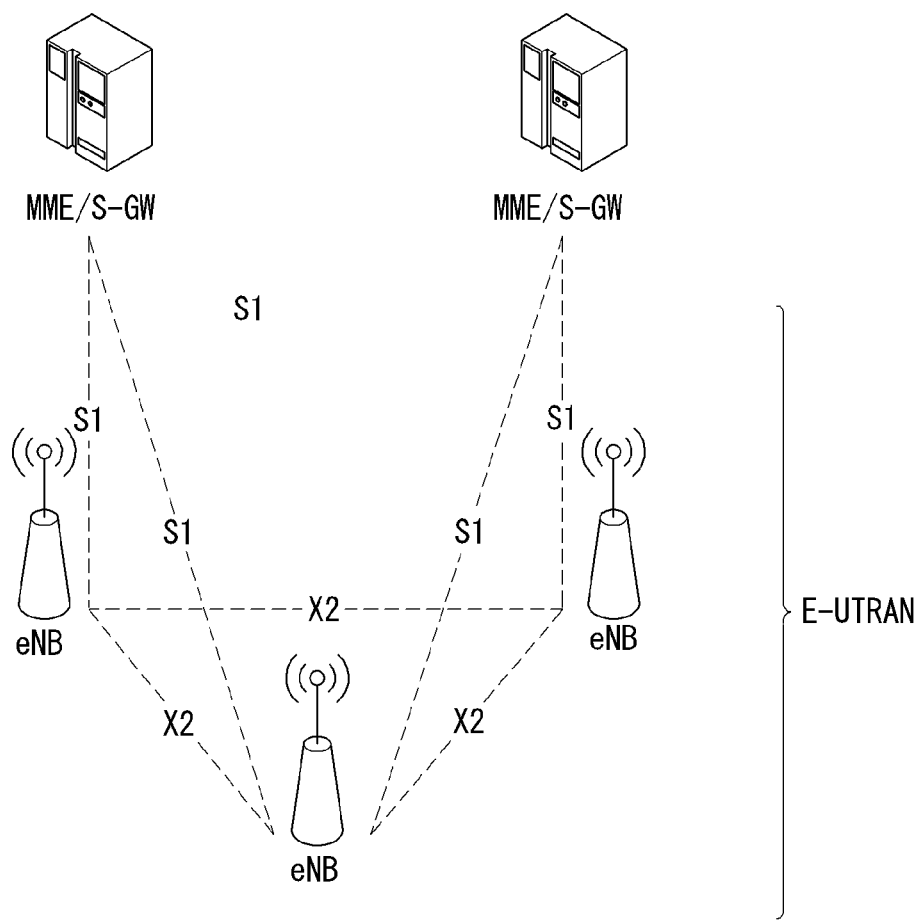

[Fig. 3]
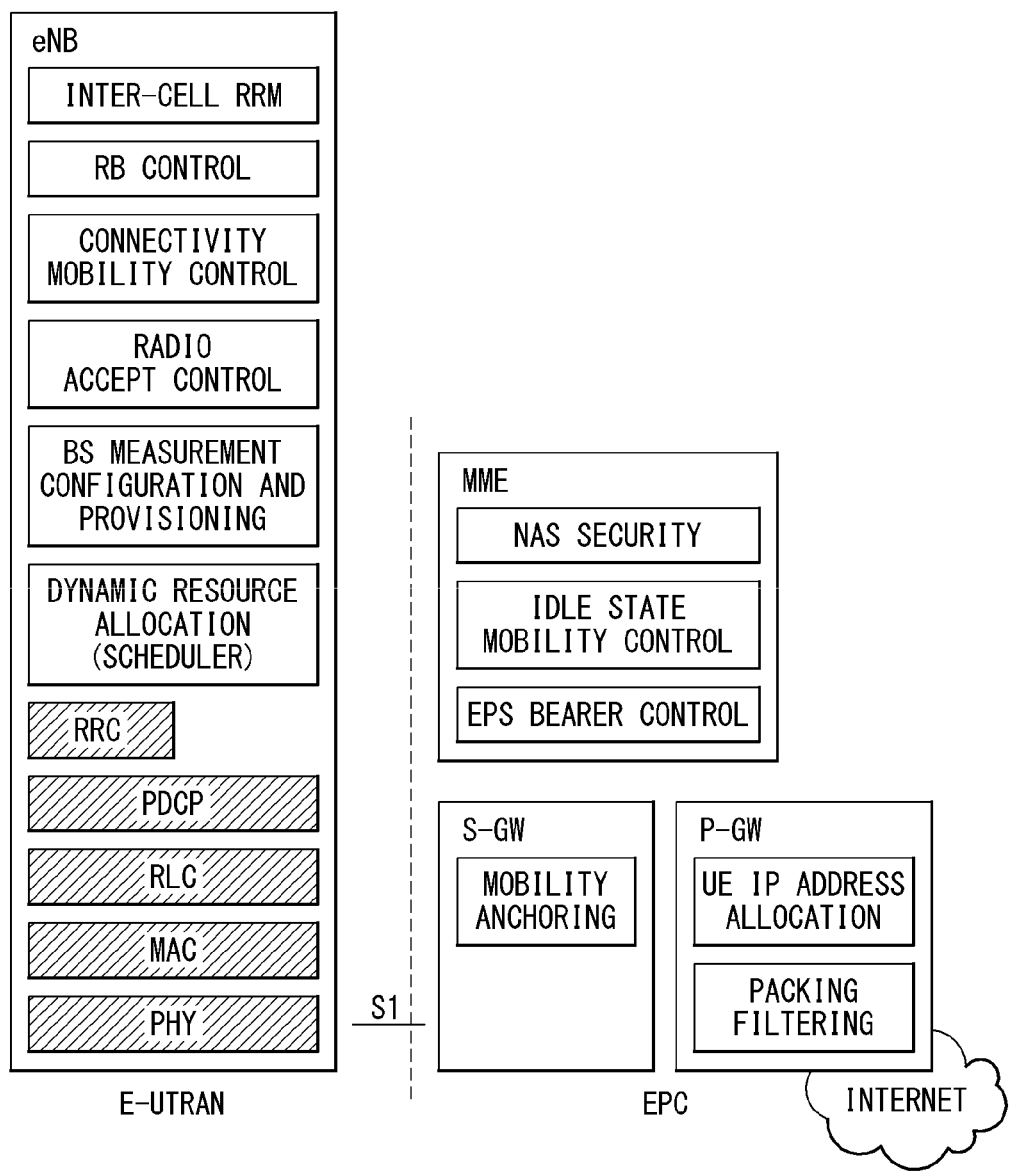

[Fig. 4]
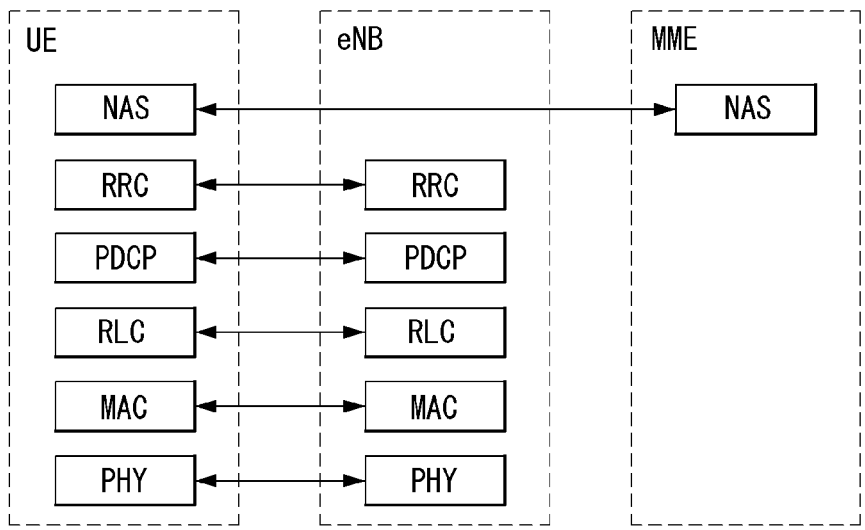
(a) CONTROL PLANE PROTOCOL STACK
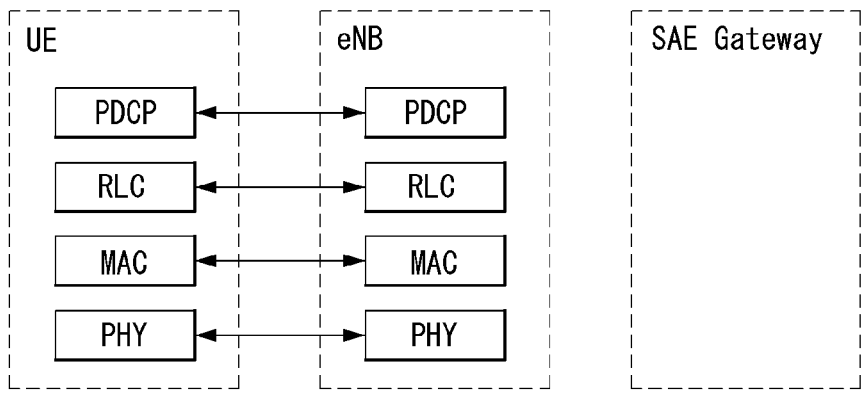
(b) USER PLANE PROTOCOL STACK
[Fig. 5]
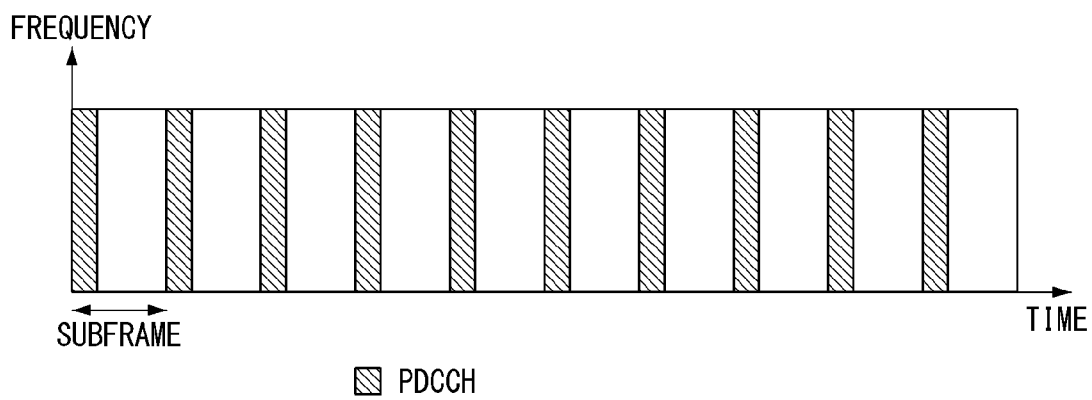

[Fig. 6]
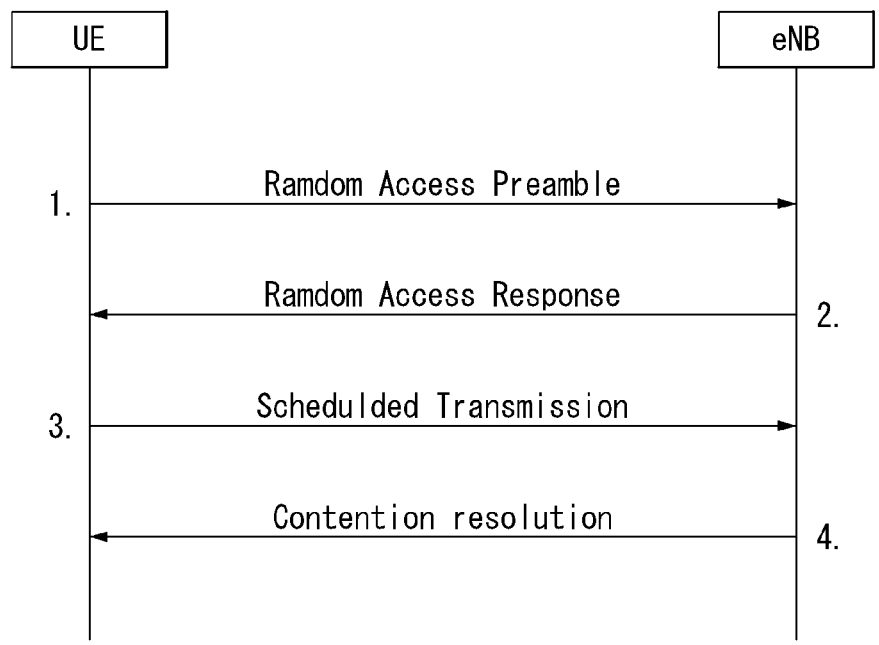

[Fig. 7]
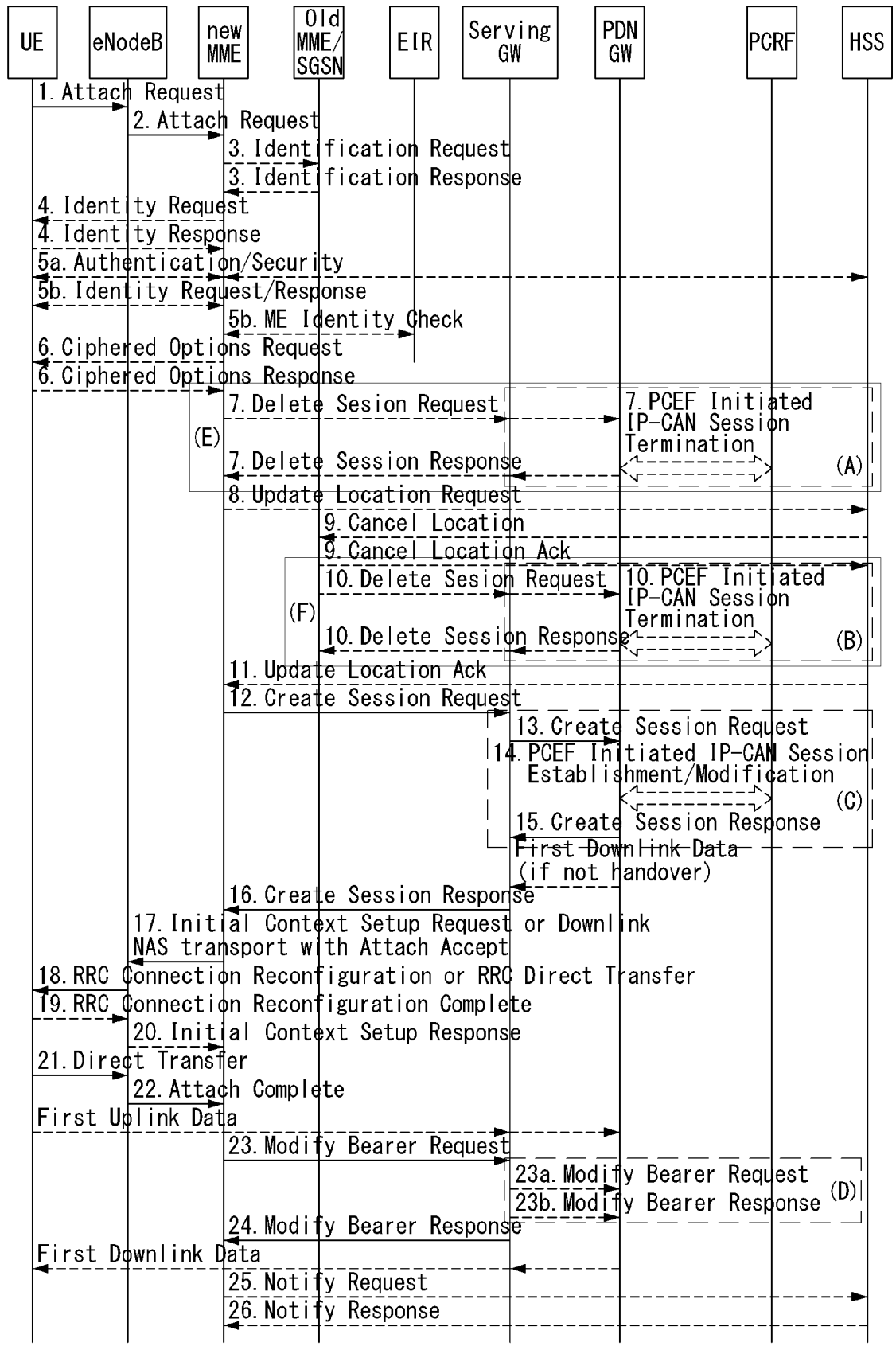

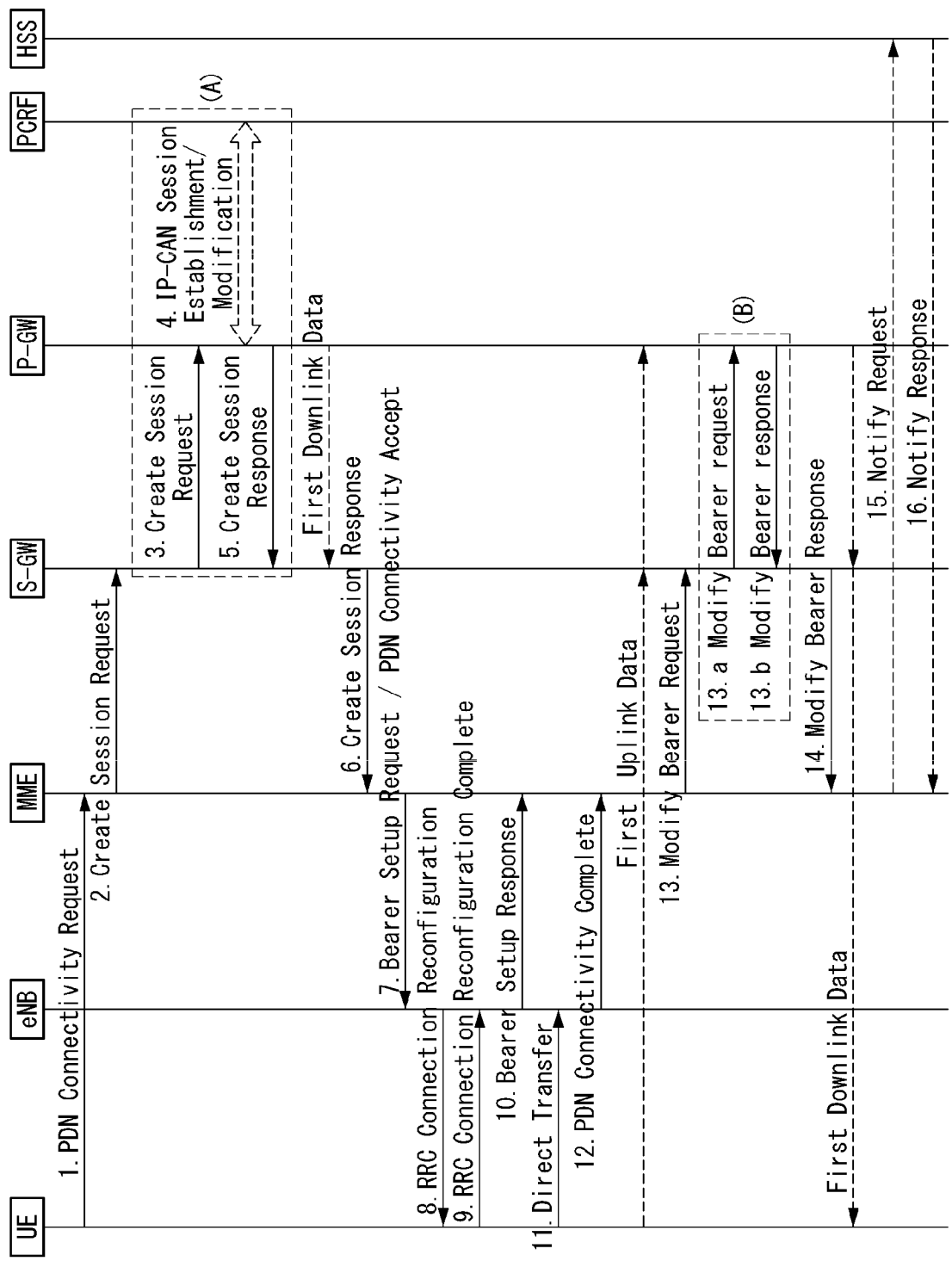
[Fig. 8]

[Fig. 9]
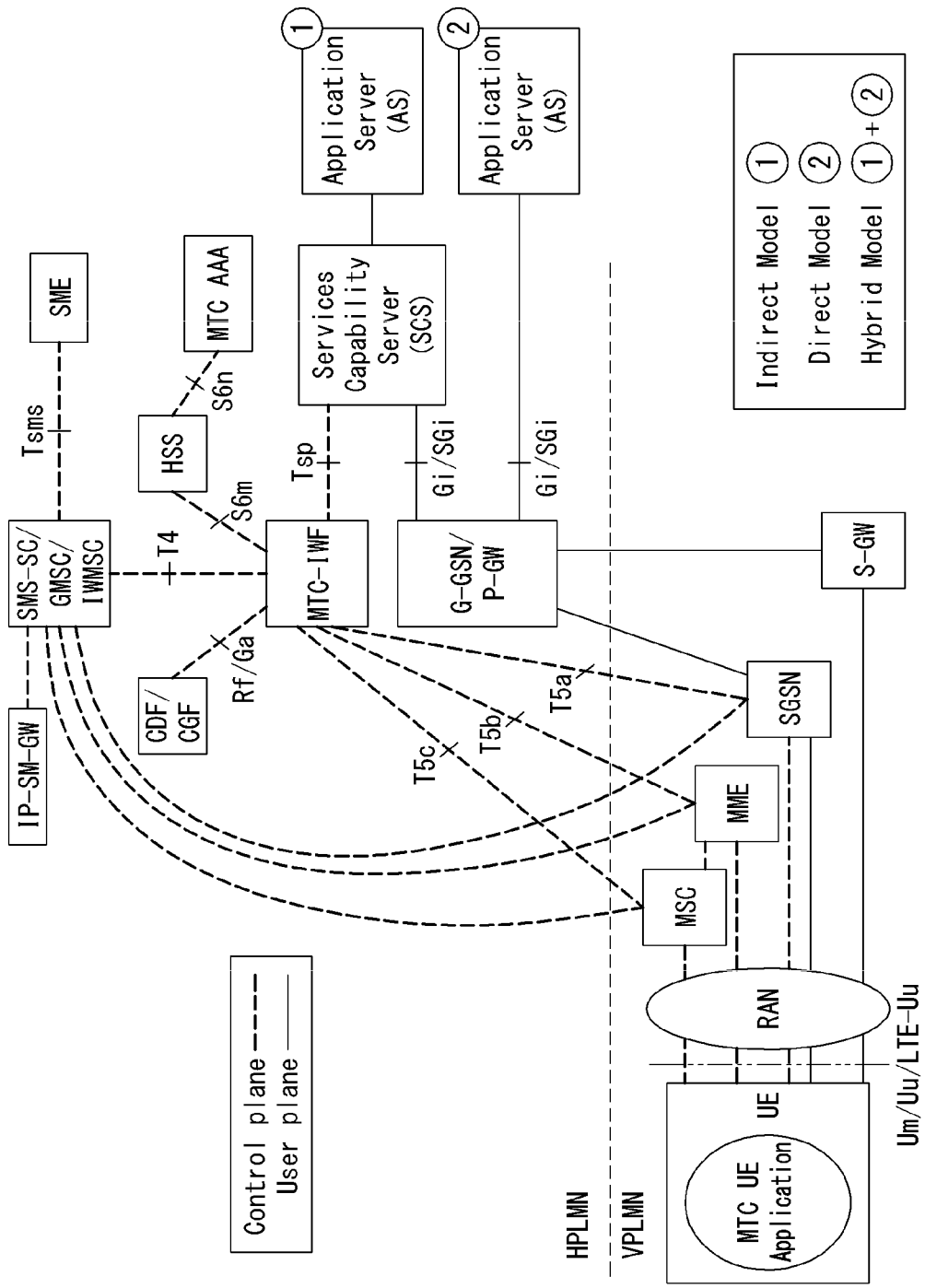

[Fig. 10]
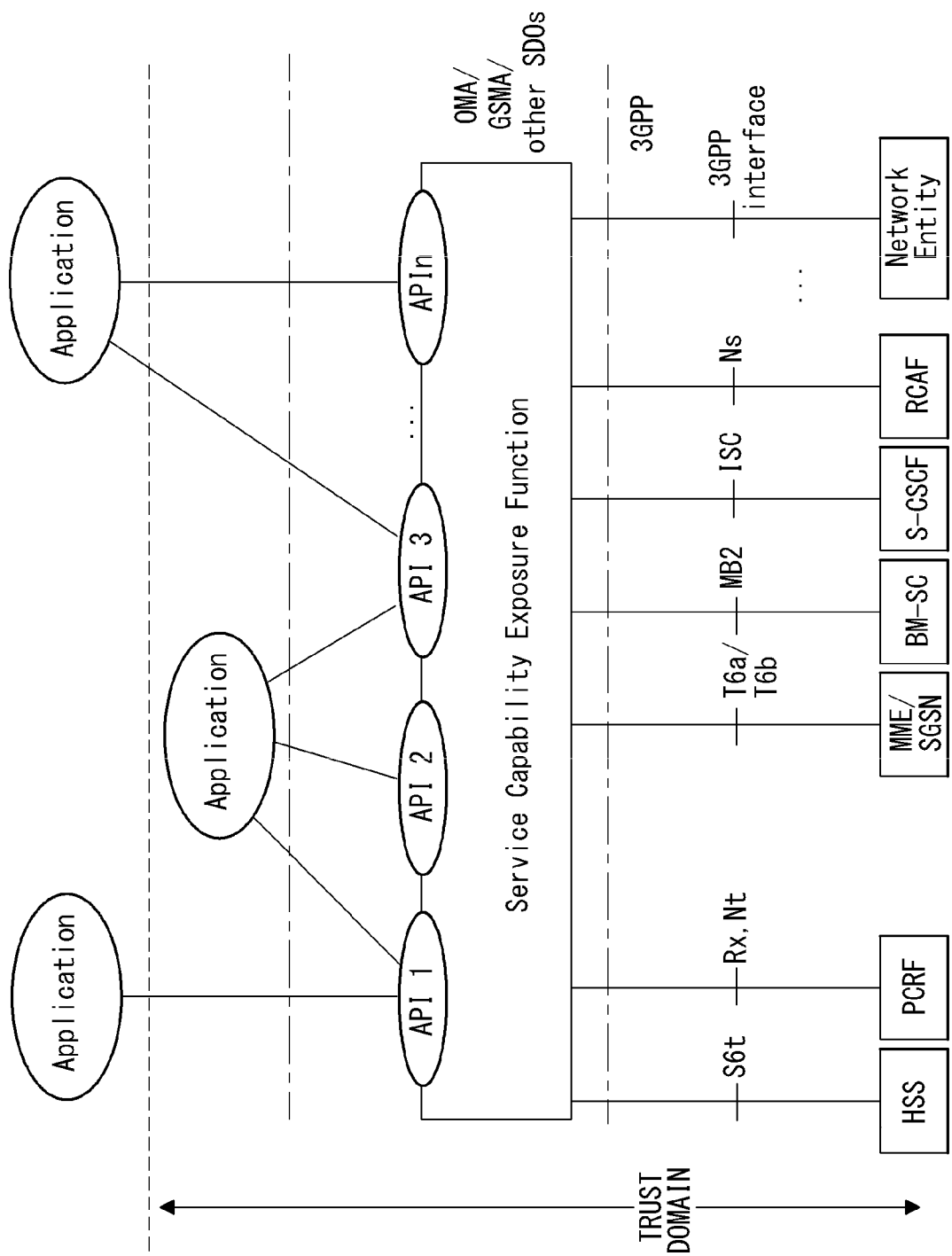

[Fig. 11]
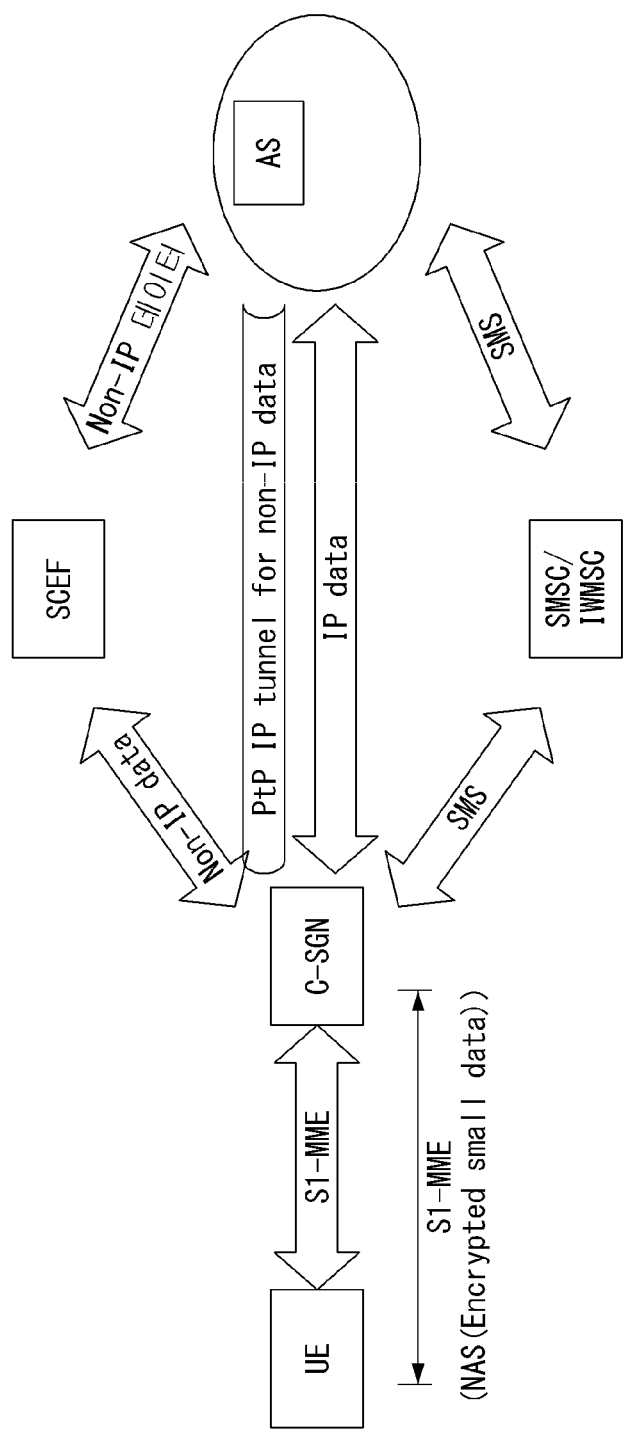

【Fig. 12】
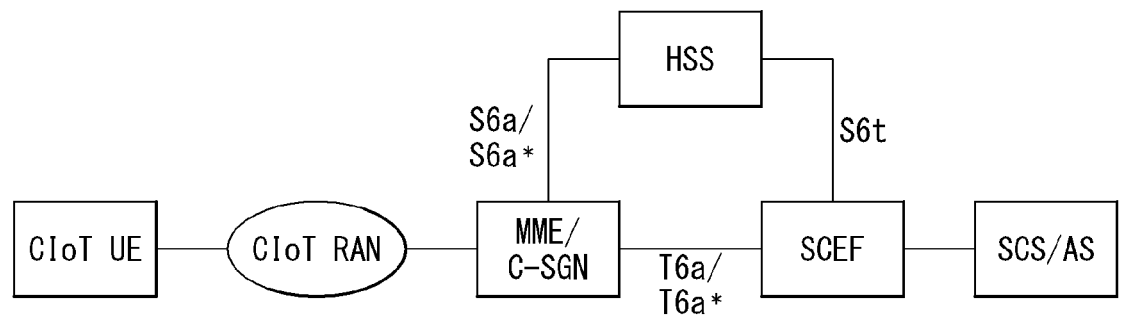

[Fig. 13]
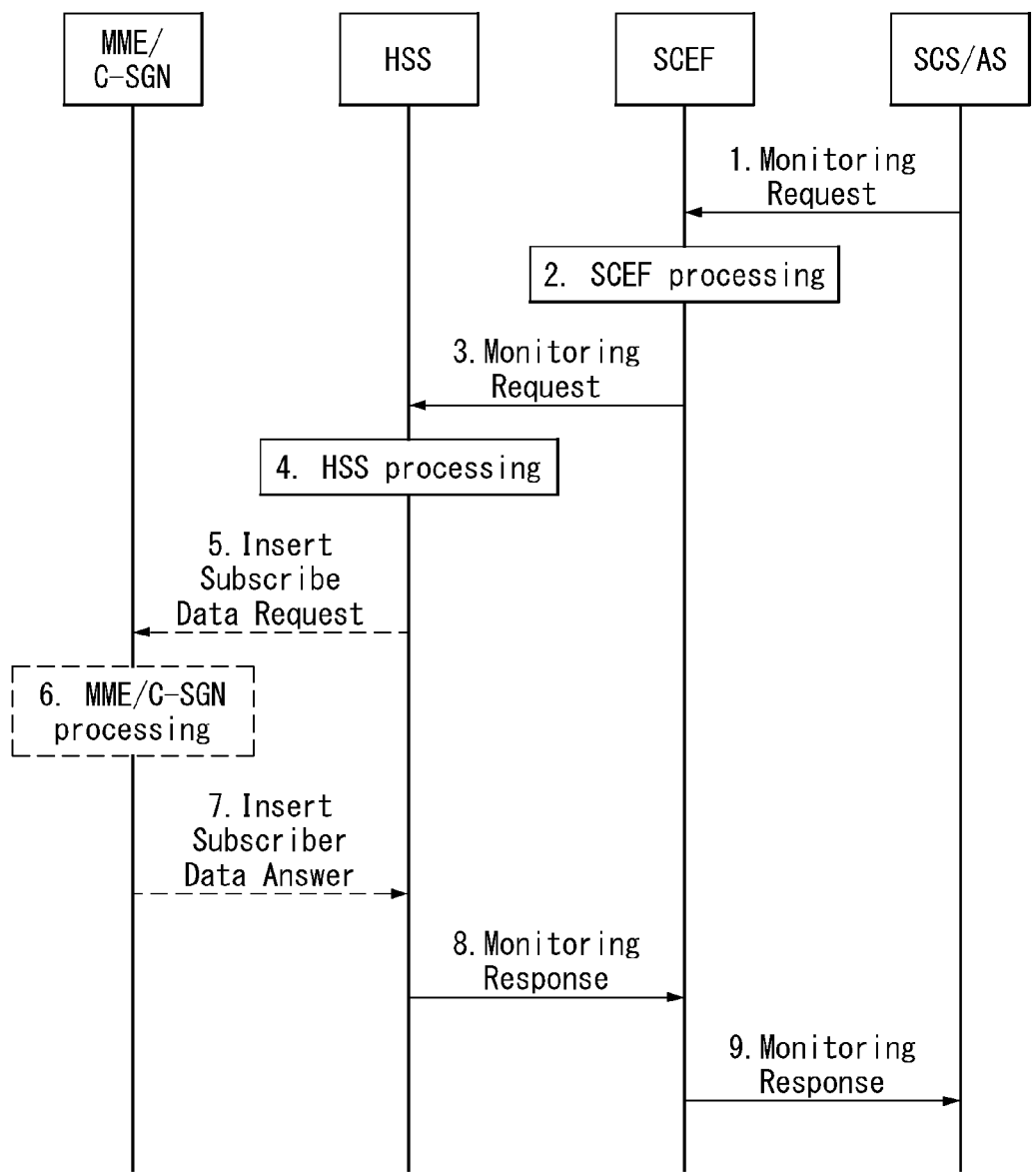

[Fig. 14]
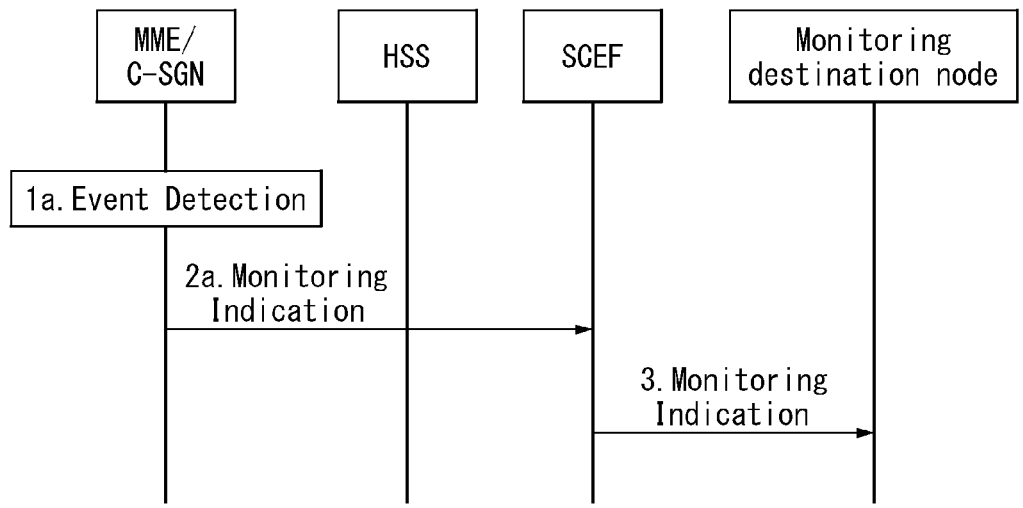
[Fig. 15]
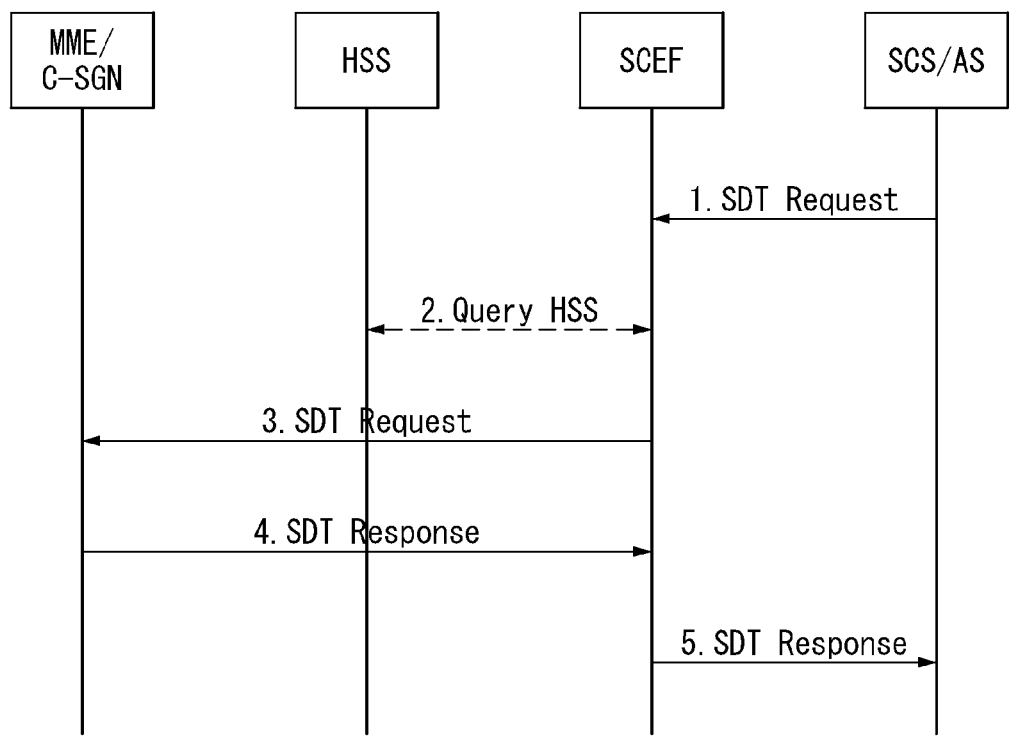

【Fig. 16】
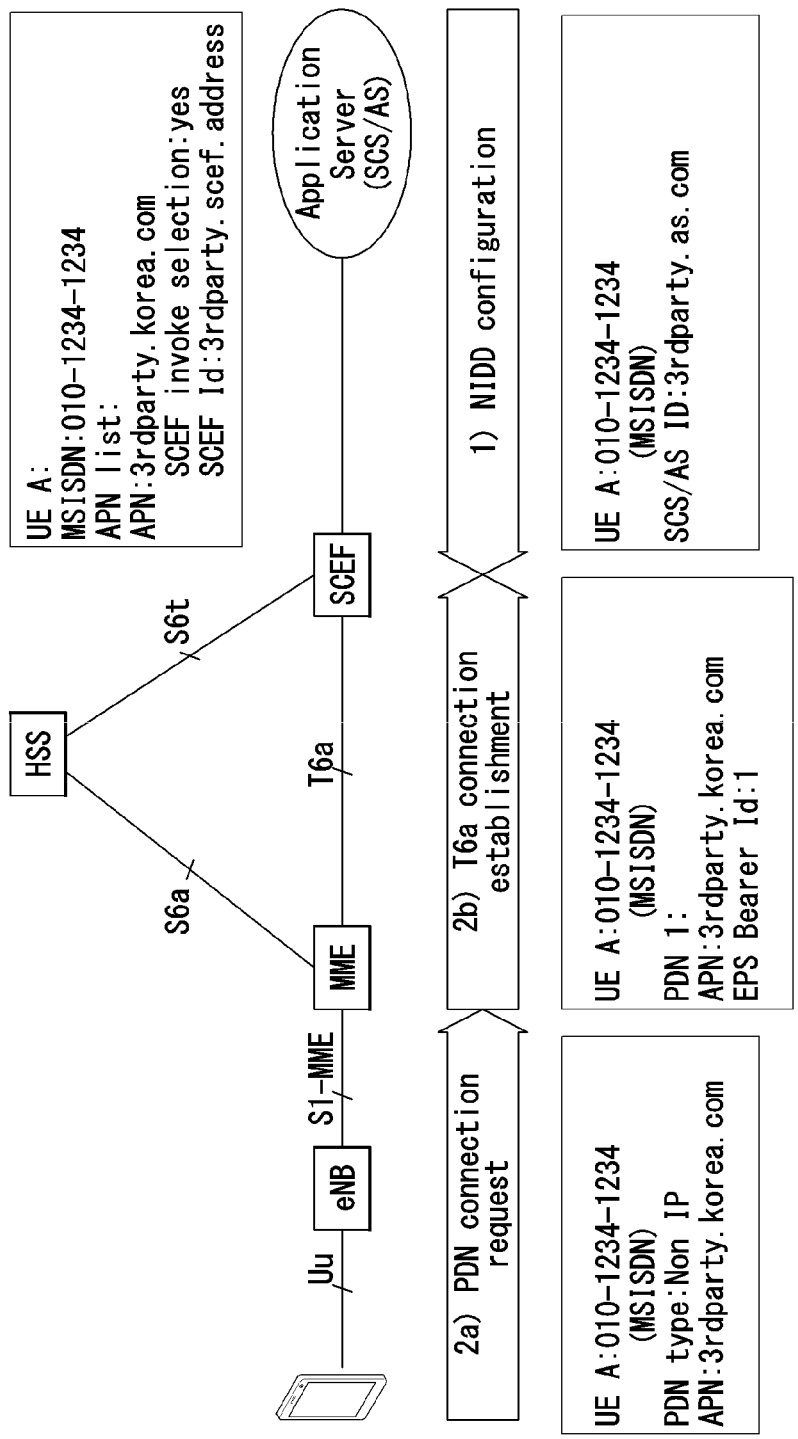

【Fig. 17】
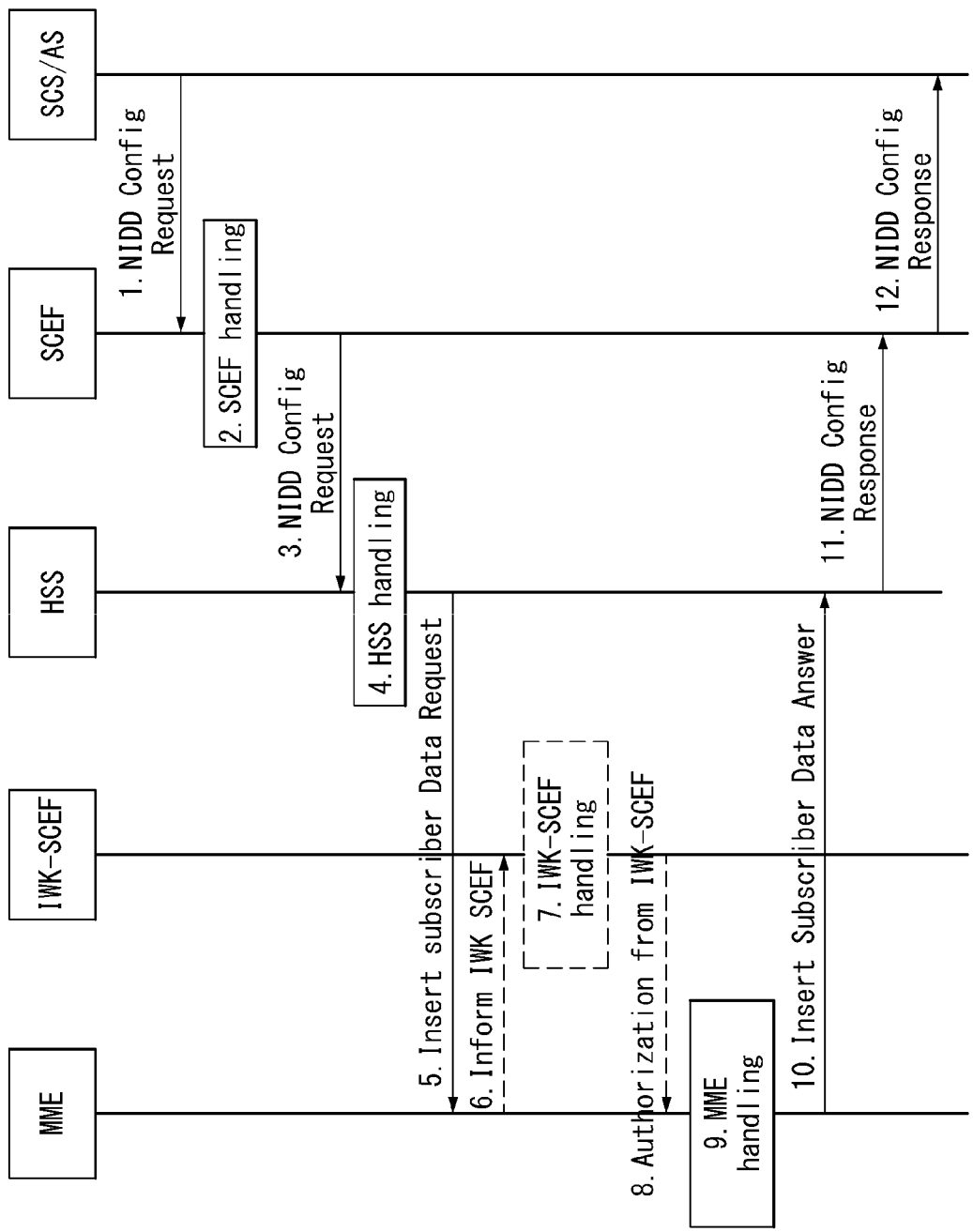

[Fig. 18]
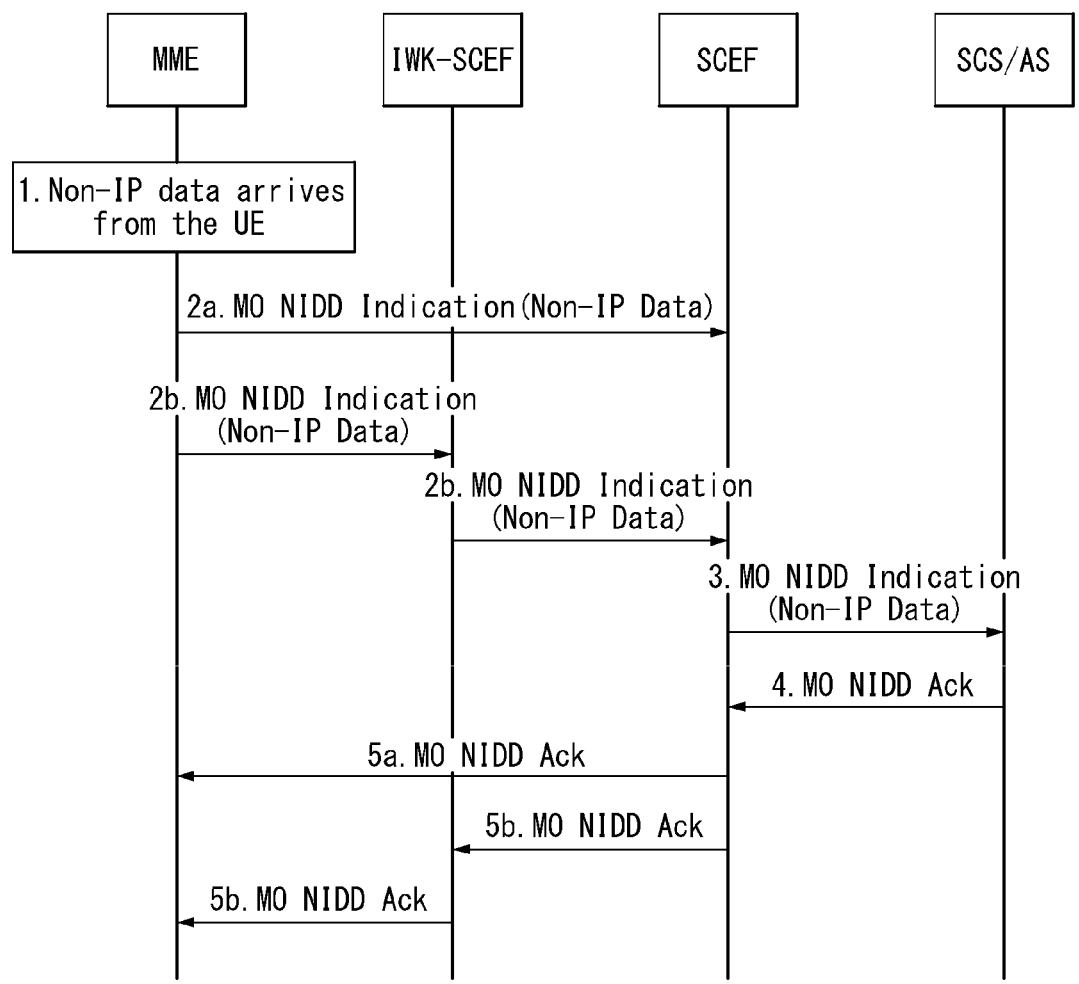

[Fig. 19]
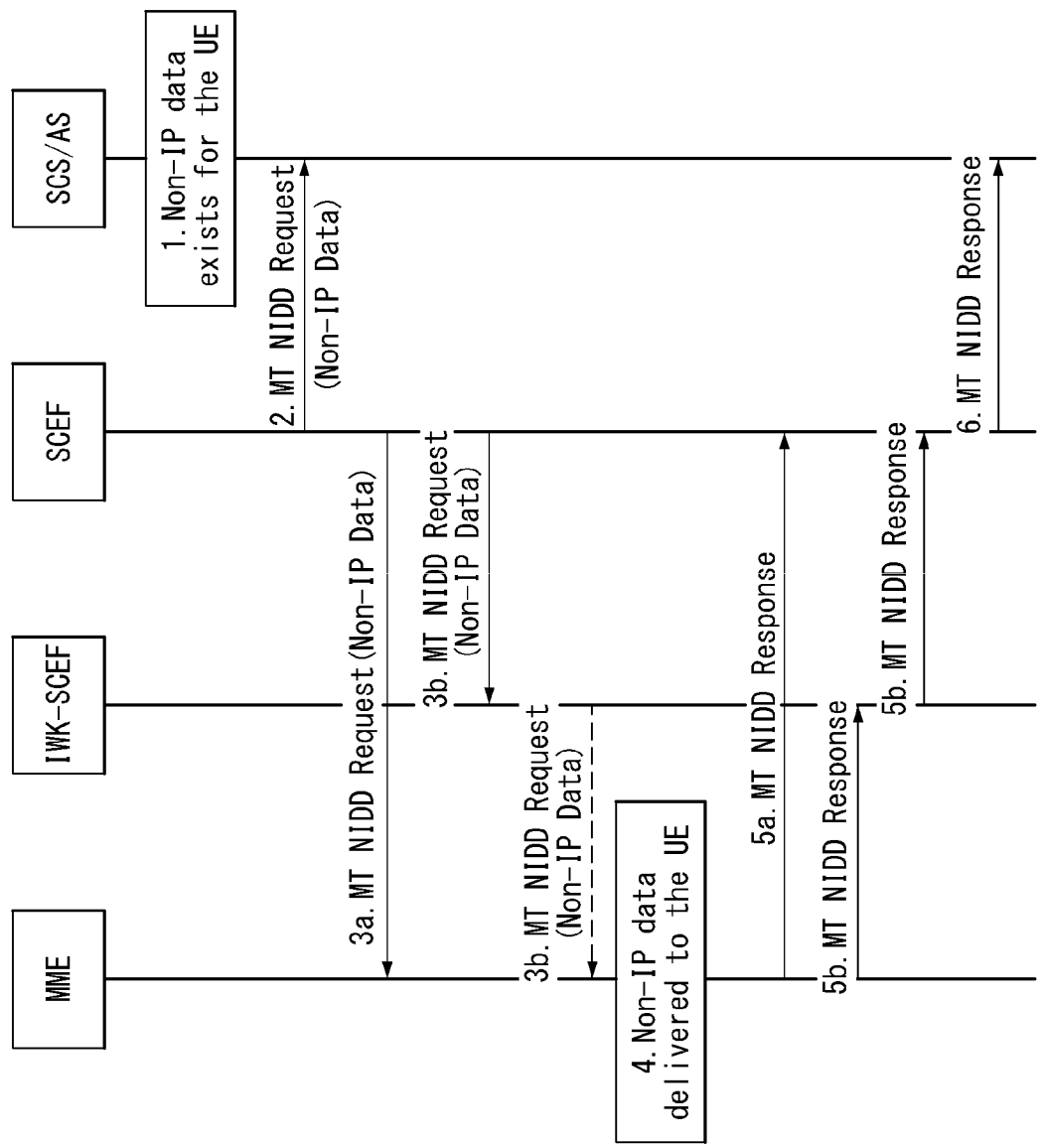

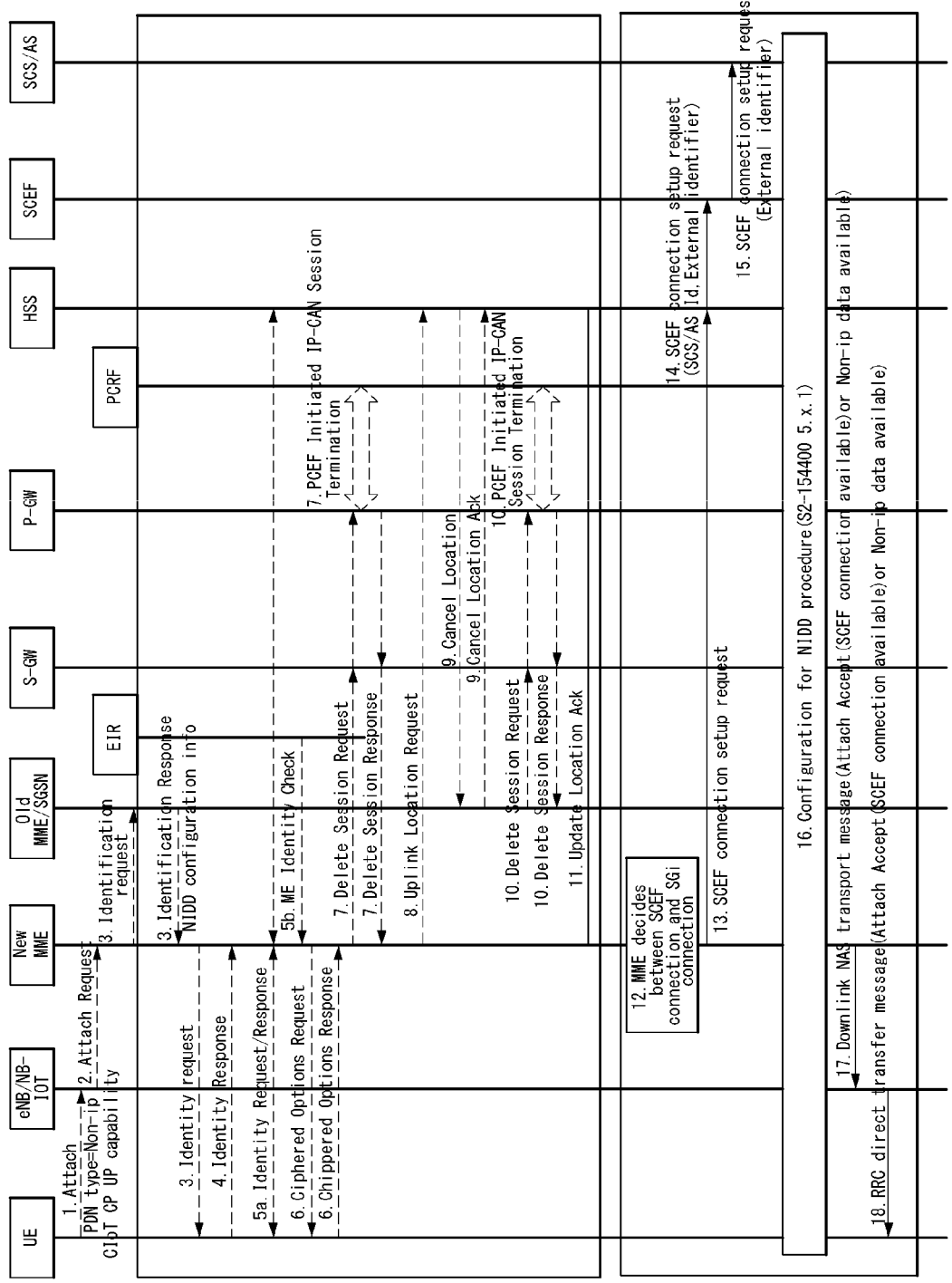
[Fig. 20]

[Fig. 21]
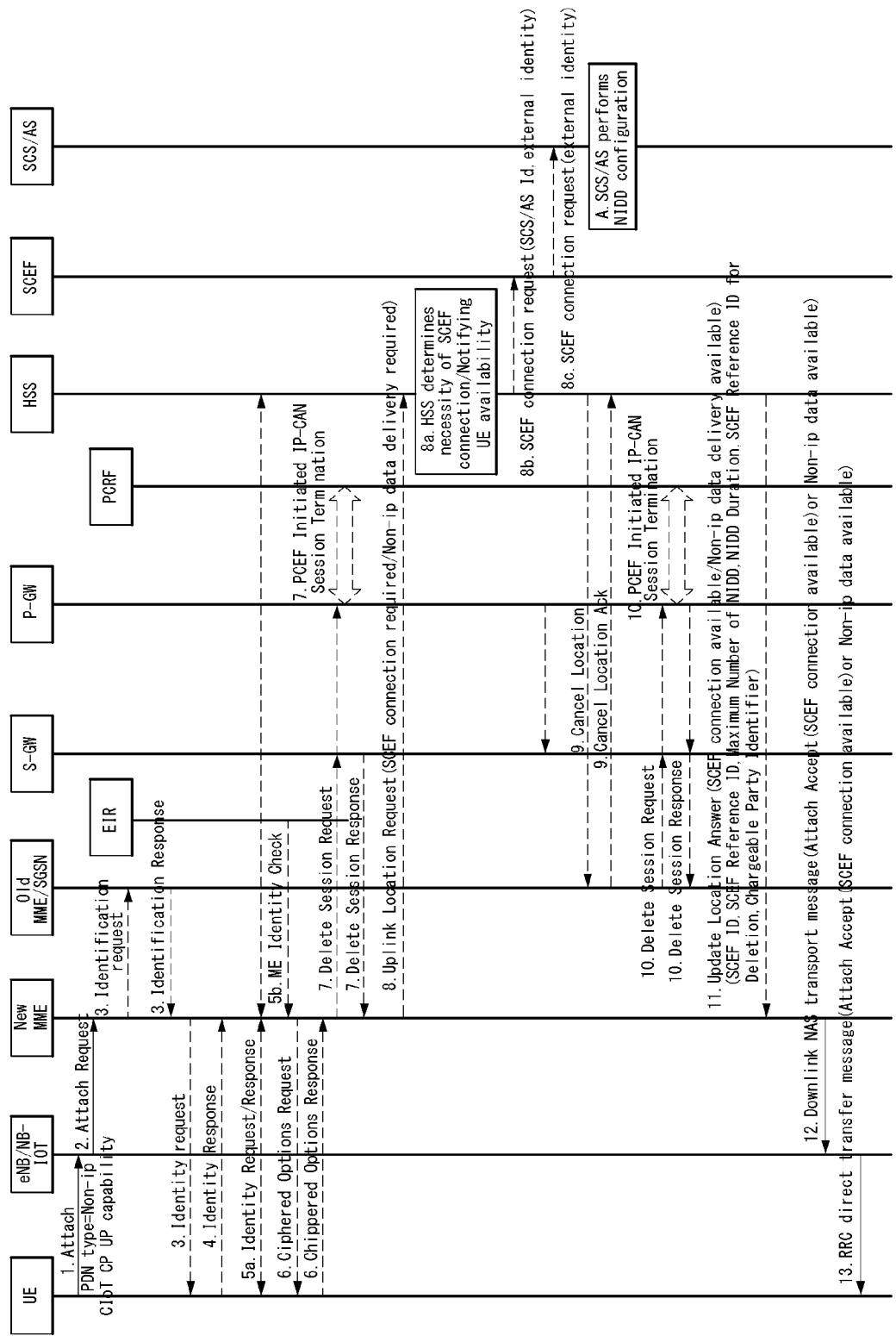

[Fig. 22]
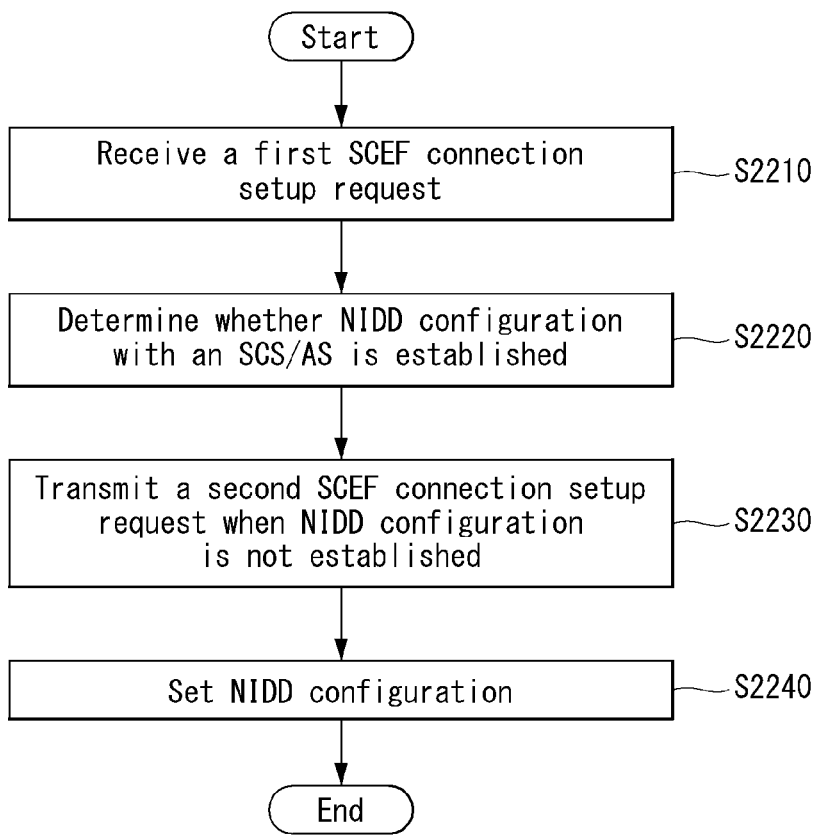
[Fig. 23]
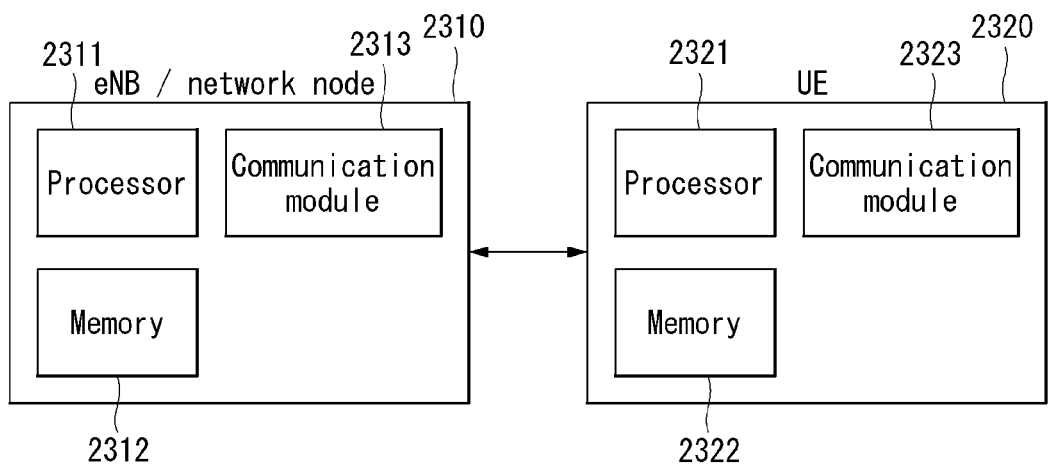

[Fig. 24]
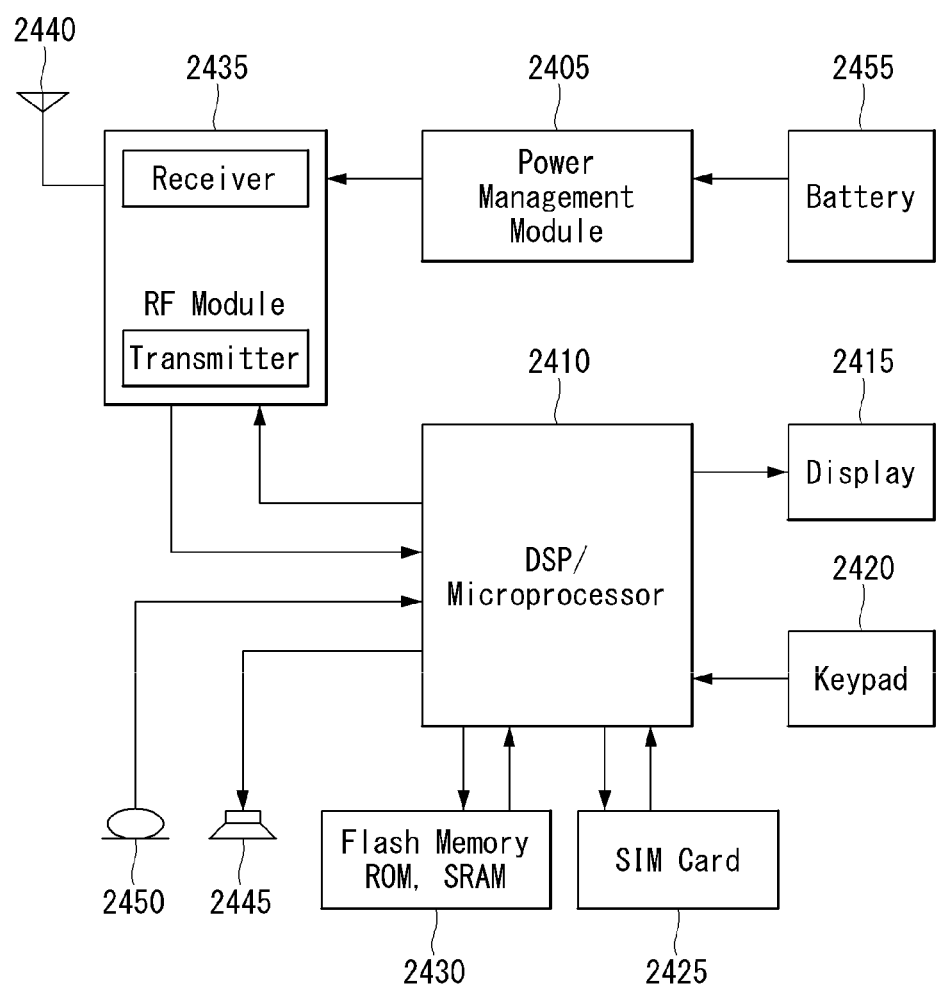

METHOD FOR SETTING CONFIGURATION OF NON-IP DATA DELIVERY (NDID) IN WIRELESS COMMUNICATION SYSTEM AND DEVICE FOR SAME

CROSS-REFERENCE TO RELATED APPLICATIONS

This application is the National Phase of PCT International Application No. PCT/KR2017/000294, filed on Jan. 9, 2017, which claims priority under 35 U.S.C. 119(e) to U.S. Provisional Application No. 62/275,790, filed on Jan. 7, 2016, which are hereby expressly incorporated by reference into the present application.

TECHNICAL FIELD

The present invention relates to a wireless communication system. More specifically, the present invention relates to a method for setting configuration of Non-IP Data Delivery (NIDD) of a network node and a device supporting the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

Small data transmission and reception based on the SCEF includes mobile originated calls. According to the current standard, when NIDD configuration is not set/established, a core network node is unable to process a mobile originated call even if a UE transmits the mobile originated call. However, since the UE does not know whether NIDD is currently possible, the UE transmits small data (namely, mobile originated calls) even though the current NIDD configuration has not been set/established. As a result, if an MME fails to buffer the small data received from the UE before the NIDD configuration is set, the small data has to be discarded, which causes an inefficiency/problem.

Therefore, an object of the present invention is to propose a method for setting NIDD configuration, by which a network node checks/sets NIDD configuration and transmission and reception of small data (for example, non-IP data) is performed smoothly.

Technical objects to be achieved by the present invention are not limited to those described above. Other technical objects of the present invention may also be clearly understood from the descriptions given below by those skilled in the art to which the present invention belongs.

Technical Solution

According to one aspect of the present invention, a method for the Service Capability Exposure Function (SCEF) in a wireless communication system to set Non-IP Data Delivery (NIDD) configuration comprises receiving, from a network node, a first SCEF connection setup request for non-IP data transmission of a user equipment (UE), wherein the first SCEF connection setup request comprises an external identifier of the UE and a Services Capability Server (SCS)/Application Server (AS) identifier of an SCS/AS which provides a service for the UE; determining whether the NIDD configuration for the SCS/AS has been established; when the NIDD configuration has not been established: transmitting a second SCEF connection setup request for establishing the NIDD configuration to the SCS/AS, wherein the second SCEF connection setup request comprises the external identifier of the UE; and setting the NIDD configuration for the SCS/AS and the UE.

Also, the external identifier of the UE may correspond to an International Mobile Subscriber Identity (IMSI) of the UE, and the SCS/AS ID may be stored in the HSS as subscriber information of the UE.

Also, the network node may correspond to a Home Subscriber Server (HSS) or a Mobility Management Entity (MME).

Also, when the network node corresponds to the MME and an SCEF delivery method for the non-IP data transmission is selected as the MME determines to support the non-IP data transmission through the control plane of the UE, the first SCEF connection setup request may be received from the MME.

Also, when the network node corresponds to the HSS and the HSS determines that the NIDD configuration for the non-IP data transmission is required through an Update Location Request (ULR) message, the first SCEF connection setup request may be received from the HSS.

Also, the setting NIDD configuration may comprise receiving, from the SCS/AS, a first NIDD configuration request message requesting setting the NIDD configuration with the UE; and transmitting, to an HSS, a second NIDD configuration request message for setting the NIDD configuration on the basis of the first NIDD configuration request message received, wherein the first and the second NIDD configuration request messages include an SCS/AS identifier for the SCS/AS and SCS/AS reference identifier, the maximum number of NIDD, NIDD duration and/or NIDD destination address.

Also, the method for setting NIDD configuration may further comprise receiving a first Mobile Oriented (MO) NIDD indication message notifying of transmission of MO data as the non-IP data after the NIDD configuration is set; and transmitting a second MO NIDD indication message to the SCS/AS, wherein the first and the second MO NIDD indication messages comprise the SCEF reference identifier and the MO data.

Also, the method for setting NIDD configuration may further comprise receiving a first MO NIDD Acknowledge (Ack) message in response to the second MO NIDD indication message; and transmitting a second MO NIDD Ack message in response to a first MO NIDD indication message.

Also, the method for setting NIDD configuration may further comprise receiving a first Mobile Terminated (MT)

NIDD request message notifying of transmission of MT data as the non-IP data from the SCS/AS after the NIDD configuration is set; and transmitting a second MO NIDD request message, wherein the first and the second MO NIDD request messages comprise the SCEF reference identifier and the MT data.

Also, the method for setting NIDD configuration may further comprise receiving a second MT NIDD response message in response to the second MT NIDD request message; and transmitting a first MT NIDD response message in response to a first MT NIDD request message, wherein, when an MME determines that a transmission of the MT data is impossible, the second MT NIDD response message includes a cause value indicating a reason why the transmission is impossible.

Also, according to another aspect of the present invention, a Service Capability Exposure Function (SCEF) for setting Non-IP Data Delivery (NIDD) configuration in a wireless communication system comprises a communication module configured to transmit and receive a signal; and a processor configured to control the communication module, wherein the processor is further configured to: receive, from a network node, a first SCEF connection setup request for non-IP data transmission of a user equipment (UE), wherein the first SCEF connection setup request comprises an external identifier of the UE and a Services Capability Server (SCS)/Application Server (AS) identifier of an SCS/AS which provides a service for the UE; determine whether the NIDD configuration for the SCS/AS has been established; when the NIDD configuration has not been established: transmit a second SCEF connection setup request for establishing the NIDD configuration to the SCS/AS, wherein the second SCEF connection setup request comprises the external identifier of the UE; and set the NIDD configuration for the SCS/AS and the UE.

Also, the external identifier of the UE may correspond to an International Mobile Subscriber Identity (IMSI) of the UE, and the SCS/AS ID may be stored in the HSS as subscriber information of the UE.

Also, the network node may correspond to a Home Subscriber Server (HSS) or a Mobility Management Entity (MME).

Also, when the network node corresponds to the MME and an SCEF delivery method for the non-IP data transmission is selected as the MME determines to support the non-IP data transmission through the control plane of the UE, the first SCEF connection setup request may be received from the MME.

Also, when the network node corresponds to the HSS and the HSS determines that the NIDD configuration for the non-IP data transmission is required through an Update Location Request (ULR) message, the first SCEF connection setup request may be received from the HSS.

Advantageous Effects

According to an embodiment of the present invention, a UE becomes capable of recognizing whether the current NIDD configuration has been set and in that case, the UE becomes capable of transmitting small data, thereby reducing the problem that small data is discarded.

Also, according to another embodiment of the present invention, if a UE performs data transmission and reception through the SCEF when an attach process is operated, instead of being made to wait for the NIDD configuration triggered by an SCS/AS to be established/performed at the network level, the UE is enabled to actively request the NIDD configuration directly from the SCS/AS, leading to an effect that the UE is enabled to perform transmission and reception of small data smoothly.

The advantageous effect that may be achieved from the present invention are not limited to those described above, and it should be clearly understood by those skilled in the art to which the present invention belongs that other effects not mentioned in this document may be achieved from the descriptions given below.

DESCRIPTION OF DRAWINGS

The accompanying drawings, which are included to provide a further understanding of the present invention and constitute a part of specifications of the present invention, illustrate embodiments of the present invention and together with the corresponding descriptions serve to explain the principles of the present invention.

FIG. 1 is a diagram schematically exemplifying an evolved packet system (EPS) to which the present invention can be applied.

FIG. 2 illustrates an example of evolved universal terrestrial radio access network structure to which the present invention can be applied.

FIG. 3 exemplifies a structure of E-UTRAN and EPC in a wireless communication system to which the present invention can be applied.

FIG. 4 illustrates a structure of a radio interface protocol between a UE and E-UTRAN in a wireless communication system to which the present invention can be applied.

FIG. 5 is a diagram schematically showing a structure of a physical channel in a wireless communication system to which the present invention may be applied.

FIG. 6 is a diagram for describing a contention based random access procedure in a wireless communication system to which the present invention may be applied.

FIG. 7 illustrates a flow diagram illustrating an attach procedure according to one embodiment of the present invention.

FIG. 8 is a diagram schematically showing a PDN connectivity procedure in a wireless communication system to which the present invention may be applied.

FIG. 9 is a diagram showing an architecture for machine-type communication (MTC) in a wireless communication system to which the present invention may be applied.

FIG. 10 is a diagram showing an architecture for service capability exposure in a wireless communication system to which the present invention may be applied.

FIG. 11 is a diagram showing an end-to-end small data flow in a wireless communication system to which the present invention may be applied.

FIG. 12 shows a cellular IoT network architecture proposed for efficient non-IP small data transmission through an SCEF in a wireless communication system to which the present invention may be applied.

FIG. 13 shows a procedure of configuring and deleting a monitoring event through an HSS in a wireless communication system to which the present invention may be applied.

FIG. 14 shows an MO small data transmission procedure in a wireless communication system to which the present invention may be applied.

FIG. 15 shows an MT small data transmission procedure in a wireless communication system to which the present invention may be applied.

FIG. 16 shows a link setup process for transmitting UL/DL data (i.e., non-IP data) through an MME and an SCEF in a wireless communication system to which the present invention may be applied.

FIG. 17 illustrates a procedure for setting NIDD configuration in a wireless communication system to which the present invention may be applied.

FIG. 18 illustrates an MO NIDD procedure in a wireless communication system to which the present invention may be applied.

FIG. 19 illustrates an MT NIDD procedure in a wireless communication system to which the present invention may be applied.

FIG. 20 is a flow diagram illustrating an attach procedure for an SCEF connection according to a first embodiment of the present invention.

FIG. 21 is a flow diagram illustrating an attach procedure for an SCEF connection according to a second embodiment of the present invention.

FIG. 22 is a flow diagram illustrating a procedure for setting NIDD configuration according to one embodiment of the present invention.

FIG. 23 illustrates a block diagram of a communication device according to one embodiment of the present invention.

FIG. 24 illustrates a block diagram of a communication device according to one embodiment of the present invention.

MODE FOR INVENTION

In what follows, preferred embodiments according to the present invention will be described in detail with reference to appended drawings. The detailed descriptions provided below together with appended drawings are intended only to explain illustrative embodiments of the present invention, which should not be regarded as the sole embodiments of the present invention. The detailed descriptions below include specific information to provide complete understanding of the present invention. However, those skilled in the art will be able to comprehend that the present invention can be embodied without the specific information.

For some cases, to avoid obscuring the technical principles of the present invention, structures and devices well-known to the public can be omitted or can be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) can be replaced with a fixed station, Node B, evolved-NodeB (eNB), Base Transceiver System (BTS), or Access Point (AP). Also, a terminal can be fixed or mobile; and the term can be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter can be part of the base station, and a receiver can be part of the terminal. Similarly, in uplink transmission, a transmitter can be part of the terminal, and a receiver can be part of the base station.

Specific terms used in the following descriptions are introduced to help understanding the present invention, and the specific terms can be used in different ways as long as it does not leave the technical scope of the present invention.

The technology described below can be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA can be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA can be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present invention can be supported by standard documents disclosed in at least one of wireless access systems including the IEEE 802, 3GPP, and 3GPP2 specifications. In other words, among the embodiments of the present invention, those steps or parts omitted for the purpose of clearly describing technical principles of the present invention can be supported by the documents above. Also, all of the terms disclosed in this document can be explained with reference to the standard documents.

To clarify the descriptions, this document is based on the 3GPP LTE/LTE-A, but the technical features of the present invention are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

User Equipment (UE): A UE can be called a terminal, Mobile Equipment (ME), or Mobile Station (MS). A UE can be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It can be installed inside or outside a mobile communication network. It can provide an interface through which an MTC user can access the server. Also, an MTC server can provide MTC-related services to other servers (in the form of Services Capability Server (SCS)) or the MTC server itself can be an MTC Application Server.

(MTC) application: services (to which MTC is applied) (for example, remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and a node in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN can be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

In what follows, the present invention will be described based on the terms defined above.

Overview of System to Which the Present Invention May Be Applied

FIG. 1 illustrates an Evolved Packet System (EPS) to which the present invention can be applied.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit-Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities can be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Also, in case the UE moves across serving areas by the eNodeB, the SGW acts as an anchor point for local mobility. In other words, packets can be routed through the SGW to ensure mobility within the E-UTRAN (Evolved-UMTS (Universal Mobile Telecommunications System) Terrestrial Radio Access Network defined for the subsequent versions of the 3GPP release 8). Also, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Also, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways can be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Also, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (namely, an operator) provides, via various components within the EPC based not only on the 3GPP access but also on the non-3GPP access.

Also, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points can be defined according to network structures.

TABLE 1

| Reference point | Description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present invention can be applied.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

The S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present invention can be applied.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present invention can be applied.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN can be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Also, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Also, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer can be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers can be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells can be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service can be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be existed in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 is a diagram schematically exemplifying a structure of physical channel in a wireless communication system to which the present invention can be applied.

Referring to FIG. 5, the physical channel delivers signaling and data through radio resources including one or more subcarriers in frequency domain and one or more symbols in time domain.

One subframe that has a length of 1.0 ms includes a plurality of symbols. A specific symbol (s) of subframe (e.g., the first symbol of subframe) may be used for PDCCH. The PDCCH carries information for resources which are dynamically allocated (e.g., resource block, modulation and coding scheme (MCS), etc.).

Random Access Procedure

Hereinafter, a random access procedure which is provided in a LTE/LTE-A system will be described.

The random access procedure is performed in case that the UE performs an initial access in a RRC idle state without any RRC connection to an eNB, or the UE performs a RRC connection re-establishment procedure, etc.

The LTE/LTE-A system provides both of the contention-based random access procedure that the UE randomly selects to use one preamble in a specific set and the non-contention-based random access procedure that the eNB uses the random access preamble that is allocated to a specific UE.

FIG. 6 is a diagram for describing the contention-based random access procedure in the wireless communication system to which the present invention can be applied.

(1) Message1 (Msg 1)

First, the UE randomly selects one random access preamble (RACH preamble) from the set of the random access preamble that is instructed through system information or handover command, selects and transmits physical RACH (PRACH) resource which is able to transmit the random access preamble.

The eNB that receives the random access preamble from the UE decodes the preamble and acquires RA-RNTI. The RA-RNTI associated with the PRACH to which the random access preamble is transmitted is determined according to the time-frequency resource of the random access preamble that is transmitted by the corresponding UE.

(2) Message 2 (Msg 2)

The eNB transmits the random access response that is addressed to RA-RNTI that is acquired through the preamble on the Msg 1 to the UE. The random access response may include RA preamble index/identifier, UL grant that informs the UL radio resource, temporary cell RNTI (TC-RNTI), and time alignment command (TAC). The TAC is the information indicating a time synchronization value that is transmitted by the eNB in order to keep the UL time alignment. The UE renews the UL transmission timing using the time synchronization value. On the renewal of the time synchronization value, the UE renews or restarts the time alignment timer. The UL grant includes the UL resource allocation that is used for transmission of the scheduling message to be described later (Message 3) and the transmit power command (TPC). The TCP is used for determination of the transmission power for the scheduled PUSCH.

The UE, after transmitting the random access preamble, tries to receive the random access response of its own within the random access response window that is instructed by the eNB with system information or handover command, detects the PDCCH masked with RA-RNTI that corresponds to PRACH, and receives the PDSCH that is indicated by the detected PDCCH. The random access response information may be transmitted in a MAC packet data unit and the MAC PDU may be delivered through PDSCH.

The UE terminates monitoring of the random access response if successfully receiving the random access response having the random access preamble index/identifier same as the random access preamble that is transmitted to the eNB. Meanwhile, if the random access response message has not been received until the random access response window is terminated, or if not received a valid random access response having the random access preamble index same as the random access preamble that is transmitted to the eNB, it is considered that the receipt of random access response is failed, and after that, the UE may perform the retransmission of preamble.

(3) Message 3 (Msg 3)

In case that the UE receives the random access response that is effective with the UE itself, the UE processes the information included in the random access response respectively. That is, the UE applies TAC and stores TC-RNTI. Also, by using UL grant, the UE transmits the data stored in the buffer of UE or the data newly generated to the eNB.

In case of the initial access of UE, the RRC connection request that is delivered through CCCH after generating in RRC layer may be transmitted with being included in the message 3. In case of the RRC connection reestablishment procedure, the RRC connection reestablishment request that is delivered through CCCH after generating in RRC layer may be transmitted with being included in the message 3. Additionally, NAS access request message may be included.

The message 3 should include the identifier of UE. There are two ways how to include the identifier of UE. The first method is that the UE transmits the cell RNTI (C-RNTI) of its own through the UL transmission signal corresponding to the UL grant, if the UE has a valid C-RNTI that is already allocated by the corresponding cell before the random access procedure. Meanwhile, if the UE has not been allocated a valid C-RNTI before the random access procedure, the UE transmits including unique identifier of its own (for example, S-TMSI or random number). Normally the above unique identifier is longer that C-RNTI.

If transmitting the data corresponding to the UL grant, the UE initiates a contention resolution timer.

(4) Message 4 (Msg 4)

The eNB, in case of receiving the C-RNTI of corresponding UE through the message 3 from the UE, transmits the message 4 to the UE by using the received C-RNTI. Meanwhile, in case of receiving the unique identifier (that is, S-TMSI or random number) through the message 3 from the UE, the eNB transmits the 4 message to the UE by using the TC-RNTI that is allocated from the random access response to the corresponding UE. For example, the 4 message may include the RRC connection setup message.

The UE waits for the instruction of eNB for collision resolution after transmitting the data including the identifier of its own through the UL grant included the random access response. That is, the UE attempts the receipt of PDCCH in order to receive a specific message. There are two ways how to receive the PDCCH. As previously mentioned, in case that the message 3 transmitted in response to the UL grant includes C-RNTI as an identifier of its own, the UE attempts the receipt of PDCCH using the C-RNTI of itself, and in case that the above identifier is the unique identifier (that is, S-TMSI or random number), the UE tries to receive PDCCH using the TC-RNTI that is included in the random access response. After that, in the former case, if the PDCCH is received through the C-RNTI of its own before the contention resolution timer is terminated, the UE determines that the random access procedure is performed and terminates the procedure. In the latter case, if the PDCCH is received through the TC-RNTI before the contention resolution timer is terminated, the UE checks on the data that is delivered by PDSCH, which is addressed by the PDCCH. If the content of the data includes the unique identifier of its own, the UE terminates the random access procedure determining that a normal procedure has been performed. The UE acquires C-RNTI through the 4 message, and after that, the UE and network are to transmit and receive a UE-specific message by using the C-RNTI.

Meanwhile, the operation of the non-contention-based random access procedure, unlike the contention-based random access procedure illustrated in FIG. 11, is terminated with the transmission of message 1 and message 2 only. However, the UE is going to be allocated a random access preamble from the eNB before transmitting the random access preamble to the eNB as the message 1. And the UE transmits the allocated random access preamble to the eNB as the message 1, and terminates the random access procedure by receiving the random access response from the eNB.

Attach Procedure

A UE is required to be registered in the network in order to receive a desired service. Such a kind of registration may be referred to as network attachment. In what follows, an initial attach procedure in the E-UTRAN will be described.

FIG. 7 illustrates a flow diagram illustrating an attach procedure according to one embodiment of the present invention.

1-2. First, a UE camped on the E-UTRAN cell may initiate an attach procedure to a new MME by transmitting an attach request message to an eNB.

The attach request message includes the International Mobile Subscriber Identity (IMSI) of the UE and a PDN type that the UE requests. Here, the PDN type indicates the IP version (namely IPv4, IPv4v6, or IPv6) that the UE requests.

The attach request message is delivered by being included in an RRC connection setup complete message from an RRC connection and delivered by being included in an initial UE message from an S1 signaling connection.

To request PDN connectivity, the UE may transmit the attach request message together with a PDN connectivity request message.

3. If the UE identifies itself by using a GUTI and MME is changed after being detached, a new MME may determine the type of an old node (for example, MME or SGSN) and use the GUTI received from the UE to obtain the address of the old MME/SGSN. Also, the new MME may transmit an identification request (including the old GUTI and a complete attach request message) to the old MME/SGSN to request an IMSI. The old MME may then check the attach request message by using the NAS MAC and make an identification response (including the IMSI and MM context) in response to the identification request.

4. If the UE is unknown to both of the old MME/SGSN and the new MME, the new MME may transmit an identification request to the UE to request the IMSI. The UE may respond to the corresponding identification request by using an identification response including the IMSI.

5a. If UE context for the UE does not exist in the network and the attach procedure is not integrity protected or integrity is not confirmed, authentication and NAS security setup to activate the integrity protection and NAS ciphering may always be performed. If NAS security algorithm is changed, the NAS security setup may be performed at the current step.

5b. The new MME may retrieve the ME Identity (IMEISV) from the UE or search the UE for the ME Identity. At this time, the ME Identity (IMEISV) may be transmitted after being encoded except when the UE performs emergency attachment or the UE may not be authenticated.

6. If the UE sets a ciphered options transfer flag for the attach request message, the new MME may retrieve ciphered options (for example, Protocol Configuration Options (PCO) and/or APN (name of PDN)) from the UE or search the UE for the ciphered options.

7. In the presence of bearer context activated by the new MME for a specific UE, the new MME deletes the bearer context by transmitting a delete session request (LBI) message to the GW. GWs respond to the LBI message with a delete session response (cause) message.

8. After detachment, if the MME is changed, the MME holds no valid UE context, UE provides the IMSI, UE provides an old GUTI not valid for the MME, or the GUTI of the UE context is different in a scenario where the PLMN-ID of the TAI by the eNB is shared in a part of the network (for example, GWCN), the MME may transmit an update location request message to the HSS.

9. The HSS transmits cancel location (including IMSI and cancellation type) to the old MME. The old MME responds through cancel location Ack (including IMSI) and removes Mobility Management (MM) context and bearer context.

10. In the presence of bearer context activated by the old MME/SGSN for a specific UE, the old MME/SGSN may remove the corresponding bearer context by transmitting a delete session request (LBI) to the GW. The GW may transmit a delete session response (cause) to the old MME/SGSN.

11. The HSS may transmit an update location Ack (including IMSI and subscription data) message to the new MME in response to the update location request message.

12. In the case of emergency attach, the MME may apply parameters from the MME emergency configuration data for establishing an emergency bearer performed at this step and ignore the IMSI-related subscription information stored temporarily.

13. The serving GW creates a new item in the EPS bearer table and sends a create session request message to the PDN GW (or P-GW) indicated by the PDN GW address received from the previous step.

14. If dynamic PCC is performed and handover command does not exist, the PDN GW performs the IP-CAN session establishment procedure defined in the TS 23.203 [6], by which the PDN GW obtains the default PCC rule for the UE.

The steps 12 to 16 may be skipped if an EPS session management (ESM) container is not included in the attach request.

15. The P-GW creates a new item in the EPS bearer context table and generates a charge ID for the default bearer. The new item enables a user plane PDU path between the S-GW and the packet data network and charge initiation for the P-GW. Also, the P-GW transmits a create session response message to the serving GW.

16. The serving GW transmits the create session response message to the new MME.

17. The new MME may transmit a downlink NAS transport to the eNB together with an initial context setup request or an attach accept message.

18. The eNB transmits an RRC connection reconfiguration message including the EPS radio bearer identity to the UE and at the same time, transmits the attach accept message to the UE.

19. The UE transmits an RRC connection reconfiguration complete message to the eNB.

20. The eNB transmits an initial context response message to the new MME. The initial context response message includes the TEID of the eNB and the address thereof used for DL traffic of an S1 -U reference point.

21. The UE sends a direct transfer message including the attach complete message (including EPS bearer identity, NAS sequence number, and NAS-MAC) to the eNB.

22. The eNB delivers the attach complete message to the new MME.

23. When both of the initial context response message of the step 20 and the attach complete message of the step 22 are received, the new MME transmits a modify bearer request message to the serving GW.

23a. If a handover command is included in the step 23, the serving GW sends a modify bearer request message (including the handover command) to the PDN GW.

23b. The PDN GW may respond to the modify bearer request message by transmitting a modify bearer response to the serving GW.

24. The serving GW may transmit a modify bearer response message (including the EPS bearer identity) to the new MME. Next, the serving GW may send buffered DL packets of the serving GW.

25. The MME sends a notify request including the APN and the PDN GW identify to the HSS for non-3GPP attachment. The corresponding message includes information for identifying the PLMN in which the PDN GW is located.

26. The HSS stores the APN and PDN GW identity pair and transmits a notify response to the MME.

PDN Connectivity Procedure

A UE requested PDN connectivity procedure is used for a UE to request connection (including allocation of a default bearer) to an additional PDN through E-UTRAN.

FIG. 8 is a diagram schematically showing a PDN connectivity procedure in a wireless communication system to which the present invention may be applied.

1. A UE initiates a UE requested PDN procedure by transmitting a PDN connectivity request message to an MME.

The PDN connectivity request message includes an APN, a PDN type (i.e., IP version) requested by the UE, etc. As described above, the PDN types indicates an IP version (i.e., IPv4, IPv4v6 or IPv6) requested by the UE.

An MME verifies whether the APN provided by the UE is permitted according to subscription information. If the UE does not provide the APN to the PDN connectivity request message, the MME uses an APN from a default PDN subscription context.

2. The MME allocates an EPS bearer ID and transmits a Create Session Request message to an S-GW.

The Create Session Request message includes the IMSI of the UE, the EPS bearer ID, a P-GW ID (i.e., P-GW address) selected by the MME for EPS bearer generation, an APN, a subscribed QoS profile received from an HSS, a PDN type, the IP address (i.e., PDN address) of the UE, etc.

Here, the PDN type equally includes PDN type information received from the UE. The IP address of the UE may be set to 0 in the case of dynamic IP address allocation and may be set to static IP address information (included in subscription information) allocated to the corresponding UE in the case of static IP address allocation.

3. An S-GW allocates an S5 S-GW TEID to a P-GW included in the Create Session Request message received from the MME in order to generate an S5 bearer and transmits a Create Session Request message to the P-GW.

The Create Session Request message includes the IMSI of the UE, the EPS bearer ID, the S5 S-GW TEID, the APN, the subscribed QoS profile, the PDN type (i.e., IP version), the IP address (i.e., PDN address) of the UE, etc.

4. The P-GW allocates an IP address to be used by the UE and performs an IP-CAN session establishment/modification procedure with a PCRF.

Here, the P-GW may allocate an IP address selected from an IP address pool held by the P-GW to the UE in the case of dynamic IP address allocation, and the static IP address information (included in the subscription information) allocated to the corresponding UE may be equally allocated in the case of static IP address allocation.

5. The P-GW allocates a P-GW TEID to the S-GW in order to generate an S5 bearer and transmits a Create Session Response message to the S-GW in response to the Create Session Request message.

The Create Session Response message includes the IMSI of the UE, the EPS bearer ID, the S5 P-GW TEID, the subscribed QoS profile, the PDN type, the IP address (i.e., PDN address) allocated to the UE, etc.

If the P-GW selects a different PDN type from the requested PDN type, the P-GW indicates the PDN type and the cause of modification of the PDN type to the UE.

When this procedure is finished, generation of the S5 bearer between the S-GW and the P-GW is completed and thus the S-GW may transmit uplink traffic to the P-GW or receive downlink traffic from the P-GW.

6. The S-GW allocates an S1 S-GW TEID in order to generate an S1 bearer and transmits a Create Session Response message to the MME in response to the Create Session Request message.

The Create Session Response message includes the IMSI of the UE, the EPS bearer ID, the S1 S-GW TEID, the PDN type, the IP address (i.e., PDN address) allocated to the UE, etc.

7. The MME transmits a PDN Connectivity Accept message to the UE in response to the PDN connectivity request message.

The PDN Connectivity Accept message includes the EPS bearer ID, the APN, the IP address (i.e., PDN address) of the UE allocated by the P-GW, the PDN type, etc.

The PDN Connectivity Accept message is included in a bearer setup request message and delivered to an eNB in S1 signaling connection.

When this procedure is finished, generation of an uplink S1 bearer between the eNB and the S-GW is completed and the eNB may transmit uplink traffic to the S-GW.

8. The PDN Connectivity Accept message is included in an RRC connection reconfiguration message and delivered from the eNB to the UE in RRC connection.

When this procedure is finished, generation of DRB between the UE and the eNB is completed and the UE may transmit uplink traffic to the eNB or receive downlink traffic from the eNB.

9. The UE transmits an RRC Connection Reconfiguration Complete message to the eNB.

10. The eNB transmits a bearer setup response message to the MME.

The bearer setup response message includes an S1 eNB TEID and the like.

11-12. The UE transmits a PDN Connectivity Complete message including the EPS bearer ID to the MME.

When this procedure is finished, generation of an uplink default EPS bearer between the UE and the P-GW is completed and the UE may transmit uplink data to the P-GW.

13. The MME delivers the S1 eNB TEID received from the eNB to the S-GW through a Modify Bearer Request message.

When this procedure is finished, generation of a downlink S1 bearer between the eNB and the S-GW is completed and the eNB may receive downlink traffic from the S-GW.

13a-13b. The bearer between the S-GW and the P-GW is updated as necessary.

14. The S-GW transmits a Modify Bearer Response message to the MME in response to the Modify Bearer Request message.

When this procedure is finished, generation of a downlink default EPS bearer between the UE and the P-GW is completed and thus the P-GW may transmit downlink data to the UE. That is, connection between the UE and the PDN is established, and the UE may be provided with a PDN service using the allocated IP address.

15. The MME transmits a Notify Request message including a P-GW ID (i.e., P-GW address) and APN to the HSS as necessary.

16. The HSS stores the P-GW ID (i.e., P-GW address) and associated APN and transmits a Notify Response message to the MME.

Machine-Type Communication (MTC)

FIG. 9 is a diagram showing an architecture for machine-type communication (MTC) in a wireless communication system to which the present invention is applicable.

An end-to-end application between a UE used for MTC (or MTC UE) and an MTC application may use services provided by a 3GPP system and optional services provided to an MTC server. The 3GPP system may provide transport and communication services (including a 3GPP bearer service, IMS and SMS) including various types of optimization for facilitating MTC.

FIG. 9 shows connection of a UE used for MTC to a 3GPP network (UTRAN, E-UTRAN, GERAN, I-WLAN, etc.) through an Um/Uu/LTE-Uu interface. The architecture of FIG. 9 includes various MTC models (a direct model, an indirect model and a hybrid model).

First, entities shown in FIG. 9 will be described.

In FIG. 9, an application server is a server on a network in which an MTC application is executed. The above-described various technologies for realizing the MTC application can be applied to the MTC application server and detailed description thereof is omitted. In addition, the MTC application server in FIG. 9 may access an MTC server through a reference point API. Detailed description thereof is omitted. Alternatively, the MTC application server may be collocated with the MTC server.

The MTC server (e.g., SCS server in FIG. 9) is a server on a network which manages MTC UEs and may be connected to a 3GPP network to communicate with UEs used for MTC and PLMN nodes.

An MTC-interworking function (MTC-IWF) may administer interworking between the MTC server and an operator core network and may serve as a proxy of MTC operation. To support the MTC indirect or hybrid model, the MTC-IWF may relay or interpret a signaling protocol on a reference point Tsp to cause a PLMN to operate a specific function. The MTC-IWF may execute a function of authenticating the MTC server before the MTC server establishes communication with the 3GPP network, a function of authenticating a control plane request from the MTC server, various functions associated with trigger indication which will be described later, etc.

A short message service-service center (SMS-SC)/Internet protocol short message gateway (IP-SM-GW) may manage transmission and reception of short message service (SMS). The SMS-SC may relay, store and deliver short messages between a short message entity (SME) (entity transmitting or receiving short messages) and UEs. The IP-SM-GW may manage protocol interworking between IP based UEs and the SMS-SC.

A charging data function (CDF)/charging gateway function (CGF) may perform charging related operations.

An HLR/HSS may execute functions of storing subscriber information (IMSI and the like), routing information, configuration information, etc. and providing the information to the MTC-IWF.

An MSC/SGSN/MME may execute control functions such as mobility management, authentication and resource allocation for connection of UEs to a network. This may execute a function of receiving trigger indication from the MTC-IWF with respect to triggering which will be described later and processing the trigger indication into a message to be provided to MTC UEs.

A gateway GPRS support node (GGSN)/serving-gateway (S-GW)+packet date network-gateway (P-GW) may serve as a gateway which manages connection between a core network and an external network.

Table 2 shows major reference points in FIG. 9.

TABLE 2

| Reference point | Description |
|---|---|
| Tsms | Reference point used for an external entity of a 3GPP system to communicate with an MTC UE through SMS |
| Tsp | Reference point used for an external entity of a 3GPP system to communicate with the MTC-IWF with respect to control plane signaling |
| T4 | Reference point used by the MTC-IWF to route device trigger to an SMS-SC of an HPLMN |
| T5a | Reference point between the MTC-IWF and a serving SGSN |
| T5b | Reference point between the MTC-IWF and a serving MME |
| T5c | Reference point between the MTC-IWF and a serving MSC |
| S6m | Reference point used by the MTC-IWF to inquire about UE identification information (E.164 Mobile Station International Subscriber Directory Number (MSISDN), IMSI mapped to an external identifier, or the like) and collect UE reachability and configuration information |

In Table 2, one or more of the reference points T5a, T5b and T5c are referred to as T5.

Meantime, user plane communication with the MTC server in the case of the indirect and hybrid models and communication with the MTC application server in the case of the direct and hybrid models may be performed using a conventional protocol through reference points Gi and SGi.

Details related to the description of FIG. 9 may be incorporated by reference by referring to 3GPP TS 23.682 document.

FIG. 10 shows an architecture for service capability exposure in a wireless communication system to which the present invention is applicable.

The architecture for service capability exposure shown in FIG. 10 enables a 3GPP network to safely expose service and capability thereof provided by a 3GPP network interface to an external third party service provider.

A service capability exposure function (SCEF) is a core entity in a 3GPP architecture for service capability exposure which provides a means for safely exposing service and capability provided by the 3GPP network interface. In other words, the SCEF is a core entity for providing a service function, which belongs to the trust domain operated by a mobile carrier. The SCEF provides an API interface to a third party service provider and provides 3GPP service functions to the third party service provider through connection with various entities of 3GPP. The SCEF may be provided by an SCS.

When Tsp function can be exposed through an application program interface (API), the MTC-IWF may be collocated with the SCEF. A protocol (e.g., DIAMETER, RESTful APIs, XML over HTTP, etc.) for specifying a new 3GPP interface depending on multiple factors is selected. Here, the multiple factors include easiness of exposure of requested information or necessity for a specific interface but are not limited thereto.

The SCEF is an entity belonging to a trust domain and may be operated by a cellular operator or a trusted third party service provider. This is a node for exposing service architecture proceeding under a work item such as monitoring enhancement (MONTE), architecture enhancements for service capability exposure (AESE) of 3GPP Release 13 and performs management such as providing functions related to monitoring and charging to an external third party by being connected to 3GPP entities which will provide services as shown in FIG. 10 and configuring a communication pattern of a third party service provider in an EPS.

Efficient Small Data Transmission for Narrow Band Internet of Things (IOT)

Cellular Internet of Things (CIoT) is a definition of new wireless access suitable for IoT service, and two CIoT schemes are under discussion in 3GPP Release-12. One is a solution evolving from GERAN into CIoT and the other is a new wireless access network form suitable for narrow band (NB) radio access technology (RAT) called "clean slate".

An architecture with respect to a new core network for efficient small data transmission for supporting narrow band IoT is under discussion in 3GPP.

FIG. 11 is a diagram showing an end-to-end small data flow in a wireless communication system to which the present invention is applicable.

As shown in FIG. 11, non-IP data may be transmitted and received between an AS and a CIoT serving gateway node (C-SGN) through a point-to-point tunnel. The C-SGN is a node added to Rel-13 in order to support CIoT UEs.

Further, an SCEF framework may be used to transmit/receive non-IP packets. In other words, non-IP data may be transmitted and received between an AS/SCS and the C-SGN through the SCEF.

In addition, non-IP data may be transmitted and received between the C-SGN and a UE through an S1-MME reference point. That is, encrypted small data (e.g., non-IP data) may be transmitted and received between the UE and the C-SGN in the NAS.

The C-SGN is a new logical entity and may be realized to support only essential functions required for the following CIoT use cases.

Some procedures required in a mobility management (MM) procedure
Efficient small data procedure
Security procedure required for efficient small data
SMS on PS domain using a non-combined GPRS attach procedure when short message service (SMS) support is required
Paging optimization for coverage enhancement
Termination of SGi interface for non-roaming cases
S8 interface support for roaming cases
Supporting attach (i.e., attach for only for SMS transmission and reception without PDN connectivity for IP (or non-IP)) procedure for only SMS
Supporting tunneling on SGi for non-IP data In addition, the following solution for small data (e.g., non-IP data) transmission using the SCEF is under discussion.

Solution) Non-IP small data transmission through the SCEF which minimizes a load applied to HSS FIG. 12 shows a cellular IoT network architecture proposed for efficient non-IP small data transmission through the SCEF in a wireless communication system to which the present invention is applicable.

T6a is a reference point used between the SCEF and a serving MME and T6b is a reference point used between the SCEF and a serving SGSN. T6a/T6b satisfy the following requirements.

T6a connects the SCEF to the serving MME.

T6b connects the SCEF to the serving SGSN.

Functions such as configuring a monitoring event in the serving MME/SGSN by the SCEF and reporting a monitoring event to the SCEF by the serving MME/SGSN are supported.

Non-IP data delivery (NIDD) from the serving MME/SGSN

S6t is a reference point used between the SCEF and an HSS and satisfies the following requirements.

The SCEF is connected to the HSS including subscription and UE related information.

Monitoring event configuration/deletion in the HSS by SCEF

Monitoring event report to the SCEF by the HSS

Configuration/deletion of communication pattern parameters by the SCEF for the HSS First, a monitoring event configuration procedure will be described.

A monitoring event of small data transmission (SDT) may be configured as follows.

Prior to mobile originated (M)) and mobile terminated (MT) small data transmission, the MME/C-SGN and the SCEF acquire information (SCEF ID and MME/C-SGN routing information) necessary for MO and MT small data transmission through a monitoring event configuration procedure.

FIG. 13 shows a monitoring event configuration and deletion procedure through the HSS in a wireless communication system to which the present invention is applicable.

1. An SCS/AS transmits a monitoring request message (external identifier(s)) or mobile station integrated system digital networks (MSISDN), an SCS/AS identifier, an SCS/AS reference ID, a monitoring type, a maximum number of reports, a monitoring duration, a monitoring destination address and an SCS/AS reference ID for deletion) to the SCEF.

Here, the SCS/AS may set the monitoring type to "SDT".

2. The SCEF stores the SCS/AS reference ID, SCS/AS identifier, monitoring destination address, monitoring duration and maximum number of reports. The SCEF allocates the SCEF reference ID. If the SCS/AS is not authorized to perform this request, the monitoring request is malformed or the SCS/AS exceeds a quota or rate of monitoring request submission on the basis of an operator policy, the SCEF performs step 9 and provides an appropriate cause value indicating an error. If the SCEF receives the SCS/AS reference ID for deletion, the SCEF derives a related SCEF reference ID for deletion.

3. The SCEF transmits a monitoring request message (an external identifier or MSISDN, an SCEF ID, an SCEF reference ID, a monitoring type, a maximum number of reports, a monitoring duration, SCEF reference ID for deletion, and a chargeable party identifier) to the HSS in order to configure a given monitoring event in the HSS and MME/SGSN.

4. The HSS checks the monitoring request message. For example, the HSS checks whether the parameters included in the message are in a range acceptable by the operator with respect to the presence of the external identifier or MSISDN, whether monitoring events are supported by the serving MME/SGSN or whether a monitoring event to be deleted is valid. The HSS optionally authorizes a chargeable party identified by the chargeable party identifier. If the aforementioned checking fails, the HSS conforms to step 8 and provides a cause value indicating the cause of the failure state to the SCEF.

The HSS stores the SCEF reference ID, the SCEF ID, the maximum number of reports, the monitoring duration and the SCEF reference ID for deletion provided by the SCEF.

5. When a specific monitoring type is requested and the monitoring events are supported by the serving MME/SGSN, the HSS transmits an Insert Subscriber Data Request message (the monitoring type, the SCEF ID, the SCEF reference ID, the maximum number of reports, the monitoring duration, the SCEF reference ID for deletion and the chargeable party identifier) to the MME/SGSN.

6. The MME/SGSN verifies the request. For example, if the monitoring type is covered according to roaming agreement when the request is transmitted from another PLMN, whether the SCEF reference ID for deletion can be served and deleted is checked. When this check fails, the MME/SGSN conforms to step 7 and provides a cause value indicating the cause of the failure state to the SCEF. The MME/SGSN may reject the request for another cause (e.g., overload or whether the HSS exceeds the monitoring request submission quota or rate) on the basis of the operator policy.

The MME/SGSN stores received parameters and, when the request is a one-time request and a monitoring event is not available in the MME/SGSN on an Insert Subscriber Data Answer transmission occasion, starts to monitor the indicated monitoring event. The MME/SGSN deletes a monitoring configuration identified by the SCEF reference ID for deletion.

7. When the monitoring configuration has been successfully performed, the MME/SGSN transmits an Insert Subscriber Data Answer (cause) message to the HSS. If the requested monitoring event is available in the MME/SGSN on the Insert Subscriber Data Answer transmission occasion, the MME/SGSN includes a monitoring event report in the Insert Subscriber Data Answer message.

8. The HSS transmits a monitoring response message (the SCEF reference ID and cause) to the SCEF in order to acknowledge authentication of the monitoring request and deletion of the identified monitoring event configuration. The HSS deletes the monitoring event configuration identified by the SCEF reference ID. If the requested monitoring event is available for the HSS on the monitoring response message transmission occasion or the requested monitoring event is received from the MME/SGSN in step 7, the HSS includes a monitoring event report in the monitoring response message.

If the request is a one-time request and Insert Subscriber Data Answer includes the monitoring event report, the HSS deletes the related monitoring event configuration.

In the case of UE mobility, the HSS determines whether a new MME/SGSN supports the requested monitoring event.

Here, if the monitoring type received in step 3 is set to "SDT", the HSS may include routing information of the MME/C-SGN in the monitoring response message.

9. The SCEF transmits the monitoring response message (the SCS/AS reference ID and cause) to the SCS/AS in order to acknowledge authentication of the monitoring request and deletion of the identified monitoring event configuration. If the SCEF receives the monitoring event report, the SCEF includes the monitoring event report in the monitoring response message. If the request is a one-time request and the monitoring response includes the monitoring event report, the SCEF deletes the related monitoring event configuration.

Common parameters related to the monitoring event configuration procedure shown in FIG. 13 are as follows.

The SCS/AS reference ID is a parameter generated by the SCS/AS and indicates specific transaction initiated by the SCS/AS for the SCEF. The SCS/AS reference ID is stored in the SCEF.

The SCEF reference ID is generated by the SCEF to correlate a monitoring event report or monitoring event deletion with a specific monitoring request and related context information in the SCEF. The SCEF reference ID is stored in the HSS, the MME or the SGSN.

The SCEF ID indicates the SCEF to which a monitoring indication message needs to be transmitted by the HSS, the MME or the SGSN. The SCEF ID is stored in the HSS, the MME or the SGSN.

The monitoring type identifies a requested specific monitoring event.

The maximum number of reports is an optional parameter and indicates a maximum number of event reports generated by the HSS, the MME or the SGSN until an associated monitoring event is considered to expire.

The monitoring duration is an optional parameter and indicates an absolute time when an associated monitoring event request is considered to expire.

Inclusion of the maximum number of repeats (having a value greater than 1) or the monitoring duration indicates that a monitoring request is continuous monitoring requests. In continuous monitoring requests, a single monitoring request may generate a plurality of monitoring indication messages.

Non-existence of the maximum number of reports and the monitoring duration indicates that a monitoring request is a one-time monitoring request. In one-time monitoring requests, a single monitoring request generates a single monitoring report.

When both the maximum number of reports and the monitoring duration are included in a given monitoring event, a monitoring request is considered to expire when a single condition is satisfied.

The monitoring destination address is an optional parameter included by the SCS/AS in order to indicate delivery of monitoring indications to a different address from a requested SCS/AS address. Non-existence of this parameter indicates that monitoring indications are delivered to the SCS/AS in which a monitoring request is generated.

The SCS/AS reference ID for deletion identifies a monitoring event configuration which needs to be deleted before a requested monitoring event configuration is applied.

The SCEF reference ID for deletion identifies a monitoring event configuration which needs to be deleted before a requested monitoring event configuration is applied.

The chargeable party identifier is an optional parameter included by the SCEF. This parameter identifies an entity for which accounting/charging functions are executed by an associated 3GPP network element.

Hereinafter, an MO small data (i.e., IP, non-IP, SMS) transmission procedure will be described.

FIG. 14 shows an MO small data transmission procedure in a wireless communication system to which the present invention is applicable.

1a. A monitoring event is detected by a node (i.e., MME/C-SGN) for which the monitoring event is configured.

That is, the MME/C-SGN may detect the monitoring event by receiving MO small data.

More specifically, a UE may send a request for establishment of RRC connection to the AS of the UE. A new NAS message format which carries small data packets in an encrypted information element (IE) may be used. Here, unencrypted part of this new NAS PDU may carry "eKSI and sequence number" IE. The MME/C-SGN may use "eKSI and sequence number" IE and SAE-temporary mobile subscriber identity (S-TMSI) to identify a security context for decrypting small data packets. A RAN may deliver a NAS PDU to the MME/C-SGN. The MME/C-SGN may decrypt a NAS message and obtain small data packets.

2a. The node (i.e., MME/C-SGN) transmits a monitoring indication message (an SCEF reference ID and a monitoring event report) to the SCEF. If a monitoring event configuration is triggered by a one-time monitoring request, the monitoring event configuration is deleted by the MME/SGSN when this step is finished. If the MME/SGSN has a maximum number of reports stored for this monitoring task, the MME/SGSN decreases the value by 1.

Here, the monitoring event report may include MO small data. The SCEF may respond to the MME/C-SGN using an acknowledgement message.

3. The SCEF retrieves a related SCS/AS reference ID along with a monitoring destination address or an SCS/AS address as a destination to which the monitoring indication message will be transmitted using the SCEF reference ID. The SCEF transmits the monitoring indication message (SCS/AS reference ID, external ID or MSISDN and monitoring information) to the identified destination.

When the maximum number of reports is reached for a continuous monitoring request, the SCEF sends a request for deletion of the related monitoring event configuration and the associated monitoring event configuration according to steps 3 to 8 of the procedure of FIG. 13 to an HSS (in the case of a monitoring event configured through the HSS) or MME(s)/SGSN(s) (in the case of a monitoring event directly configured in the MME/SGSN).

When a report about a one-time monitoring request set through the HSS is received from the MME/SGSN (step 2a), the SCEF sends a request for deletion of the related monitoring event configuration and the associated monitoring event configuration according to steps 3 to 8 of the procedure of FIG. 13 to the HSS.

Here, the SCEF may transmit MO small data to a monitoring destination node through a monitoring report procedure.

Hereinafter, an MT small data (i.e., IP data, non-IP data and SMS) transmission procedure will be described.

FIG. 15 shows an MT small data transmission procedure in a wireless communication system to which the present invention is applicable.

1. An SCS/AS transmits a small data transmission (SDT) request message (an SCS/AS reference ID for SDT and MT small data) to the SCEF.

2. If the SCEF does not have routing information which is valid for an MME/C-SGSN corresponding to the SCS/AS reference ID for SDT, the SCEF queries an HSS.

3. The SCEF transmits the SDT request message (SCS/AS reference ID for SDT, and MT small data) to the MME/C-SGN.

The MME/C-SGN may transmit the MT small data to a UE.

More specifically, the MME/C-SGN may receive small data packets from the SCEF. If there is no signaling connection to the UE, the MME/C-SGN may buffer the received small data packets and transmit paging to the UE. The UE may transmit a service request message to the MME/C-SGN as a response to the paging. Then, the C-SGN may transmit the small data packets in an encrypted IE in a NAS PDU in a downlink NAS message, and an RAN may transmit the NAS PDU to the UE.

4. The MME/C-SGN transmits an SDT response message (an SCEF reference ID for SDT, and cause) to the SCEF.

If a valid context related to the SCEF reference ID for SDT is not present in the MME/C-SGN, the MME/C-SGN notifies the SCEF of MT small data transmission failure by setting the cause to an appropriate value. In this case, the SCEF may perform the procedure from step 2 again.

5. The SCEF transmits the SDT response message (SCS/AS reference ID for SDT, and cause) to the SCS/AS.

Non-IP Data Delivery (NIDD)

Functions for NIDD may be used for UEs to deal with mobile originated (MO) and mobile terminated (MT) communication, where packets used for communication may be regarded as not being structured in the EPS standpoint. In other words, the packets may refer to non-IP packets, which, in this document, may be understood as a concept equivalent to small data. Support for non-IP data is part of CIoT EPS optimization.

The SCS/AS may request configuration of information required for delivery of non-IP data, namely configuration of an SCS/AS trigger for an NIDD procedure. In this case, the following items may be permitted.

Uplink path information (SCEF ID) associated with an SCEF reference ID and an MME for obtaining downlink path information (IMSI); and Uplink path information (SCS/AS identifier) associated with the SCEF and SCS/AS reference ID and the SCEF for obtaining downlink path information (serving MME address or IWK-SCEF ID) (where the IWK-SCEF corresponds to the node used when roaming is performed).

The MO/MT non-IP data may be delivered through an uplink/downlink path associated with a reference ID. For a given UE, (MO and MT) NIDD may be allowed only between the 3GPP network and a single SCEF. Data between the UE and the MME is delivered through the control plane optimized for the CIoT.

Hereinafter, a link setup process for UL/DL data (i.e., non-IP data) transmission through the MME/SGSN and SCEF will be described.

FIG. 16 shows a link setup process for UL/DL data (i.e., non-IP data) transmission through the MME and SCEF in a wireless communication system to which the present invention is applicable.

Since an IP protocol is not used for transmission and reception of non-IP data, the data may be transmitted and received using a P2P method. To apply this method to networks, a link (i.e., PDN connection for non-IP data transmission and reception) may be set up in advance between a UE and a PDN (i.e., an access point name (APN)) via the MME and the SCEF.

1) First, an NIDD configuration procedure is performed.

Connection setup between SCS/AS and the SCEF may be referred to as NIDD configuration. This may be regarded as prior to T6a connection setup. That is, the NIDD configuration procedure may be performed before a third party service provider contracts with an operator for IoT business and IoT UEs are deployed and registered with the network.

The SCS/AS requests setup from the SCEF for a UE which wants connection setup using the MSISDN or external identity of the UE. Then, the SCEF requests authentication handling of the UE and the SCS/AC and UE ID resolution from the HSS. That is, IMSI is a UE identifier that cannot be exposed to an external network (i.e., SCS/AS), and thus the external network can identify the UE using an MSISDN (i.e. UE number) or an external identifier, in general, as described above. Information on mapping between ID and IMSI is stored in the HSS. When the NIDD configuration procedure is successfully completed, NIDD configuration is completed and a context with respect to the corresponding UE is generated in the SCEF.

Here, the NIDD configuration procedure is performed through an API interface.

The NIDD configuration procedure will be described in more detail with reference to FIG. 17.

2a) The UE transmits a PDN connection request message to the MME.

The UE transmits APN information along with a non-IP type indication to the MME while requesting PDN connection setup (i.e., transmitting the PDN connection request message). Then, the MME checks subscription information corresponding to the APN through the HSS and determines whether PDN connection setup using the SCEF is performed.

2b) A T6a connection establishment procedure is performed.

If invoke SCEF selection is enabled as shown in Table 3, the MME starts setup of T6a connection to the SCEF. A destination SCEF used in this case may also use subscription information of the UE, which is stored in the HSS.

As described above, the UE requests PDN connection from the MME when the UE wants attachment or services. The MME determines whether T6a connection is established with reference to the subscription information of the UE when requested PDN connection is non-IP type (i.e., PDN type is "non-IP").

The T6a connection establishment procedure will be described in more detail with reference to FIG. 18.

Table 3 shows information stored in the HSS for SCEF connection.

TABLE 3

| Field | Example |
| --- | --- |
| PDN address) | N/A |
| PDN type | Non-IP |
| Access point name (APN) | www.3rdparty-service.com |
| Invoke SCEF selection | Yes |
| SCEF ID | xxx.xxx.xxx |

FIG. 17 shows an NIDD configuration procedure in a wireless communication system to which the present invention is applicable.

The flow diagram of FIG. 17 illustrates a procedure for configuring an SCEF, HSS, MME, and information required for an IWK-SCEF to perform NIDD optionally. This procedure may also be used for changing or deleting configuration information.

1. The SCS/AS transmits a NIDD configuration request message (an external identifier, Mobile Subscriber International Subscriber Directory Number (MSISDN), SCS/AS identifier, SCS/AS reference ID, the maximum number of NIDD, NIDD duration, NIDD destination address and/or SCS/AS reference ID for deletion) to the SCEF.

A relative priority scheme for processing multiple SCS/AS NIDD configuration requests may be used for determining which request to process under an overloaded condition.

The priority structure may be used locally by the SCEF and is not used nor translated for a procedure related to other functions.

The MT non-IP data within the SCS/AS may trigger an NIDD configuration request message. The SCEF may transmit an MT non-IP data after the NIDD configuration is set/established.

2. The SCEF stores an SCS/AS reference ID, SCS/AS identifier, NIDD destination address, NIDD duration and/or the maximum number of NIDD. The SCEF allocates an SCEF reference ID. The SCEF allocates an SCEF reference ID. When the SCS/AS does not have the right to perform the request according to operator policies (for example, when SLA is not allowed), or when the SCS/AS exceeds its quota or ratio of submitting NIDD configuration requests, the SCEF performs the step 12 and provides a cause value indicating the error appropriately. When the SCEF receives an SCS/AS reference ID for deletion, the SCEF derives the related SCEF reference ID for deletion.

3. If required, the SCEF transmits an NIDD configuration request message (an external identifier or SCID reference ID, SCID reference ID, the maximum number of NIDD, NIDD duration, SCEF reference ID for deletion and/or chargeable party identifier) to the HSS to configure the information required for NIDD with respect to the HSS and the MME.

4. The HSS examines the NIDD configuration request message (for example, whether an included parameter value belongs to the range accepted by the operator or whether NIDD configuration to be deleted is valid in association with the external identifier or existence of the MSISDN). The HSS optionally authenticates a paid party designated by a chargeable party identified by a chargeable party identifier. If this check fails, the HSS performs the step 11 and provides a cause value describing the cause of the failure to the SCEF. The HSS stores the SCEF reference ID, SCEF ID, the maximum number of NIDD, NIDD duration and/or SCEF reference ID for deletion provided by the SCEF.

5. The HSS transmits an insert subscriber data request message (SCEF ID, SCEF reference ID, the maximum number of NIDD, NIDD duration, SCEF reference ID for deletion and/or chargeable party identifier) to the MME (for example, the attach procedure).

6. When the MME is configured to use the IWK-SCEF in the PLMN of the SCEF, the MME transmits an inform IWK-SCEF message (SCEF ID, SCEF reference ID, the maximum number of NIDD, NIDD duration, SCEF reference ID for deletion and/or chargeable party identifier) to the IWK-SCEF.

When the serving MME is changed, a new/target MME is expected to inform the IWK-SCEF of UE mobility. Specific operations are performed at the step 3; otherwise, the MME performs the step 9.

7. The IWK-SCEF may authorize the request. The IWK-SCEF preforms NIDD according to the roaming agreement and records the SCEF reference ID for deletion wherever possible. If this authorization fails, the IWK-SCEF performs the step 9 and provides a cause value describing the cause of the failure to the MME. Depending on the operator policy, the IWK-SCEF may reject the request due to other reasons (for example, overload or exceeding of the quota defined by the SLA).

If NIDD configuration deletion is indicated in response to the request, the IWK-SCEF performs a final task required (for example, creation of final charging information or deletion of stored parameter values) and sends an acknowledgement to the MME at the step 9.

If the request represents continuous reporting (new or updated), the IWK-SCEF authorizes the request, stores a received parameter value if the authorization is successful, sends the authorization to the MME, and starts monitoring reception of non-IP data.

8. If authentication succeeds, the IWK-SCEF sends an authorization for the IWK-SCEF (cause) message to the MME/SGSN.

9. The MME may examine the request; for example, the MME may determine whether NIDD is requested by other PLMN or an SCEF reference ID is provided through the roaming agreement. If this examination fails, the MME performs the step 10 and provides a cause value describing the cause of the failure to the SCEF. Depending on the operator policy, the MME may reject the request due to other reasons (for example, in the case of overload or when the HSS exceeds the quota or ratio of NIDD configuration request submissions defined by the SLA).

The MME stores parameters received in the step 5 and IWK-SCEF ID (if available) in the MM context. If this is a one-time request and the MME does not receive non-IP data until transmission of an insert subscriber data answer, the MME starts monitoring the NIDD indicated by the UE. The MME deletes the NIDD configuration identified by the SCEF reference ID for deletion.

The MME transmits a parameter value as part of context information stored with respect to all of the NIDD events while the MME is changed. If the UE is separated from the network, the HSS receives the remaining reports out of the maximum number of NIDD parameters.

10. If the NIDD configuration is successful, the MME transmits an insert subscriber data response (cause) message to the HSS. If the MME is configured to use the IWK-SCEF in the PLMN, the MME includes the IWK-SCEF ID in the insert subscriber data response message.

11. If requested, the HSS transmits an NIDD configuration response message (SCEF reference ID, search MME address provision, IWK-SCEF ID, and cause) to the SCEF to check approval of the NIDD configuration request and deletion of the identified NIDD configuration. (If requested) the HSS deletes the NIDD configuration identified by the SCEF reference ID. The HSS includes serving MME address information for the SCEF which transmits, to the MME, non-IP data for MT NIDD directed to the UE. If the HSS receives the IWK-SCEF ID at the step 10, instead of a serving MME address, the HSS includes the IWK-SCEF ID in the NIDD configuration response message.

12. The SCEF transmits an NIDD configuration response message (SCS/AS reference ID and cause) to the SCS/AS and if requested, checks approval of the NIDD configuration request and deletion of the identified NIDD configuration.

FIG. 18 illustrates an MO NIDD procedure in a wireless communication system to which the present invention may be applied.

The SCS/AS may receive non-IP data from the UE through the SCEF. The SCS/AS has to request NIDD configuration to receive non-IP data through the SCEF. The reference IDs of the SCS/AS and the SCEF used in the present procedure are obtained through the NIDD configuration procedure described above.

1. The MME set by the NIDD configuration receives MO non-IP data from the UE. The MME determines to transmit non-IP data through the SCEF.

2a. If the MME is not configured to use the IWK-SCEF, the MME transmits an MO NIDD indication message (SCEF reference ID and non-IP data) to the SCEF.

2b. If the MME is configured to use the IWK-SCEF, the MME sends an MO NIDD indication message to the IWK-SCEF, and the IWK-SCEF transmits the MO NIDD indication message (the SCEF reference ID and non-IP data) to the SCEF.

3. If the SCEF is unable to search for or use the SCS/AS reference ID associated with the NIDD destination address by using the SCEF reference ID, the SCEF searches for the address of the SCS/AS as a destination of the MO NIDD indication message. The SCEF transmits the MO NIDD indication message (the SCS/AS reference ID, external ID or MSISDN, and non-IP data) to the identified destination.

4. The SCS/AS acknowledges the MO NIDD indication message to the SCEF.

5. The SCEF acknowledges the MO NIDD indication to the MME (through the IWK-SCEF when the IWK-SCEF is used).

FIG. 19 illustrates an MT NIDD procedure in a wireless communication system to which the present invention may be applied.

The SCS/AS may transmit non-IP data to the UE through the SCEF. The SCS/AS has to request NIDD configuration to transmit non-IP data through the SCEF. The reference IDs of the SCS/AS and the SCEF used in the present procedure are obtained through the NIDD configuration procedure described above.

1. The SCS/AS transmits MT non-IP data for the UE.

2. The source node transmits an MT NIDD request message (SCS/AS reference ID and non-IP data) to the SCEF.

3. The SCEF searches for an associated SCEF reference ID together with a serving MME address (step 3a) or the IWK-SCEF ID (step 3b) by using the SCS/AS reference ID.

If the serving MME address is available, the SCEF transmits the MT NIDD request message (the SCEF reference ID and non-IP data) to the serving MME (step 3a). If the IWK-SCEF ID is available, the SCEF transmits the MT NIDD request message (the SCEF reference ID and non-IP data) message to the IWK-SCEF (step 3b). The IWK-SCEF transmits the MT NIDD request message (the SCEF reference ID and non-IP data) to the serving MME.

4. The MME delivers the non-IP data to the UE.

5a. The MME responds to the MT NIDD request with respect to the SCEF. If the MME is unable to deliver the MT non-IP data, the MT NIDD request has to be rejected along with an appropriate cause value. To search for the address of the serving MME stored in an associated HSS, the SCEF transmits subscriber information request message (an external identifier or MSISDN) to the HSS, and the HSS transmits a subscriber information response message (an external identifier or MSISDN, address of the serving MME, and cause). The SCEF performs the step 3 with respect to the address of a new serving MME.

5b. The MME responds to the MT NIDD request with respect to the IWK-SCEF, and the IWK-SCEF responds to the MT NIDD request with respect to the SCEF.

6. The SCEF responds to the MT NIDD request with respect to the SCS/AS.

SCEF Connection Procedure for NIDD

Non-IP data delivery through the SCEF employs an existing SCEF framework, which is a transparent operation for a UE (namely a UE is unable to know the operation). Also, existing monitoring and service exposure capability are operations among a network, a server, and an SCEF node, which does not have an influence on UEs. For example, when an SCS/AS sets monitoring if required and an MME/HSS reports a monitored event, the SCEF configuration operation exerts no influence on the UEs.

Also, the SCEF may be used for transmission of a group message. For example, if the SCS/AS sets a group ID of a group to which the SCS/AS intends to send a group message and contents for the SCEF, the message is transmitted to the UEs belonging to the group through a Broadcast Multicast-Service Centre (BM-SC) to the MBMS contents.

Transmission and reception of small data using the SCEF includes a mobile originated call of a UE. According to the current standard, if NIDD configuration according to the procedure described with reference to FIG. 17 is not set/established, the core network node of the MME/C-GSN is unable to process mobile originated data even if the UE transmits the mobile originated data. However, since the NIDD configuration of the SCEF is a transparent operation from the standpoint of a UE, the UE is unable to know whether transmission of NIDD is possible (namely whether the SCS/AS performs/establishes the NIDD configuration) and thereby transmits uplink data/non-IP data/small data (for example, a mobile originated call) even when the NIDD configuration has not been set/established. As a result, if an MME which receives the uplink data/non-IP data/small data fails to buffer the data received from the UE before the NIDD configuration is set, the corresponding data is discarded by the MME, which causes an inefficiency/problem.

Therefore, the present invention proposes a procedure which, when a UE performs transmission and reception of data through the SCEF at the time of network attachment, requests NIDD configuration directly from the SCS/AS instead of waiting for the NIDD configuration triggered by the SCS/AS at a network node to be established/performed.

FIG. 20 is a flow diagram illustrating an attach procedure for an SCEF connection according to a first embodiment of the present invention. Regarding the present flow diagram, descriptions given with reference to FIGS. 7 and 17 may be applied in the same or in a similar manner; therefore, repeated descriptions will be omitted.

1. When an attach request is made, the UE transmits an attach request message to the network by including indication information indicating that non IP-type data is to be transmitted, CIoT User Plane (UP) capability information, or CIoT Control Plane (CP) capability information therein. Here, the CIoT UP capability information indicates whether the UE applies a UP mode, and the CIoT CP capability information indicates whether the UE applied a CP mode. The CP mode refers to the mode in which packet data are transmitted or received by being encapsulated in an NAS PDU through an SRB (namely a data transmission and reception mode through the control plane), and the UP mode refers to the mode in which packet data are transmitted and received to and from a DRB through a DRB setup (namely a data transmission and reception mode through the user plane).

2 to 11. Next, the legacy attach procedure described with reference to FIG. 7 may be performed. In other words, the steps 2 to 11 of FIG. 7 may be performed in place of the present steps of 2 to 11.

12. The MME may select either of SCEF delivery for non-IP data transmission (namely data transmission through the SCEF) and SGi delivery (data transmission through the SGi) by using configuration information and MM context information. For example, when a UE which has made an attach request does not support CP CIoT optimization, the MME may select SGi delivery, and on the other hand, when the UE supports CP CIoT optimization, the MME may select SCEF delivery. In addition, the MME may select SCEF delivery or SGi delivery depending on the network configuration and network policy.

If the MME selects SCEF delivery, the MME may check existence of a previously set/established SCEF connection (or NIDD configuration). At this time, the MME may check whether there exists an SCEF connection (or NIDD configuration) on the basis of subscription information (or HSS storage information for the SCEF connection) of the UE received from the HSS. More specifically, when the SCEF connection (or NIDD configuration) between a specific SCEF and the SCS/AS is established/set, the HSS may update the establishment/setup information for the SCEF connection as subscription information about the UE and transmit the updated subscription information to the MME. As a result, if the MME selects SCEF delivery according to the attach request of the UE, the MME may determine whether the SCEF connection (or NIDD configuration) for the corresponding UE is currently established/set by checking subscription information about the corresponding UE. At this time, the subscription information updated with respect to the SCEF connection (or NIDD configuration) may include the SCS/AS address (the address of the SCS/AS supposed to make a connection to the SCEF), the UE's external identifier (which is included when the SCEF triggers the SCS/AS for the SCEF connection (or NIDD configuration) by using the UE's ID) and/or information about whether to establish/set the current SCEF connection (or NIDD configuration) in addition to the information of Table 3 described above.

13. If the MME selects SCEF delivery and finds that there does not exist an SCEF connection (or NIDD configuration) for the UE which has made an attach request, the MME may request the HSS to establish/set the SCEF connection (or NIDD configuration) for non-IP data transmission of the UE. More specifically, if the MME determines that no SCEF connection (or NIDD configuration) exists, the MME may request the SCEF to perform T6a connection setup (through the HSS). The setup request of the SCEF connection (or T6a) may be transmitted through a Notify Request (NOR) message or a newly defined message.

14. After determining whether an SCEF connection may be established for the corresponding UE, the HSS transmits an SCEF connection setup request to a destination SCEF supporting the SCS/AS of the UE. Here, the destination SCEF may be an SCEF stored in the subscription information or an SCEF which provides a service with the SCS/AS ID of the UE. The HSS may derive the destination SCEF to be requested by the HSS to perform SCEF connection setup by using the destination SCS/AS ID or by using the SCEF ID pre-stored in the subscription information. The HSS may transmit the SCS/AS ID stored in the subscription information of the UE (the ID of the SCS/AS which services the UE) and the SCEF connection setup request including an external ID corresponding to the IMSI of the UE to the SCEF.

15. The SCEF may determine whether an SCEF connection (or NIDD configuration) to the destination SCS/AS corresponding to the SCS/AS ID received from the HSS has been currently established/set. If it is determined that the SCEF connection (or NIDD configuration) to the current destination SCS/AS has been established/set, the SCEF may terminate the procedure instead of performing the steps 15 to 18 described below. In this case, the SCEF may inform the MME that the current SCEF connection (or NIDD configuration) has already been established/set. On the other hand, if it is determined that the SCEF connection (or NIDD configuration) to the destination SCS/AS has not been established/set currently, the SCEF may transmit an SCEF connection request message including the external ID received from the HSS to the destination SCS/AS and move to the step 16.

16. The SCS/AS may perform the NIDD setup procedure described with respect to FIG. 17 and store parameters such as the SCEF ID and the SCEF reference ID so that the MME may use the parameters when the UE transmits mobile originated calls.

17. Recognizing that the SCEF connection (or NIDD configuration) has been created through the NIDD configuration procedure, the MME sends an attach accept message to the eNB. The attach accept message transmitted at this time may include an indicator representing availability of the SCEF connection (or NIDD configuration) or availability of non-IP data transmission.

18. The eNB transmits an RRC direct transfer message to the UE. The RRC direct transfer message may include an attach accept message which includes an indicator representing the availability of the SCEF connection (or NIDD configuration) or availability of non-IP data transmission. By doing so, the UE may recognize that transmission of non-IP data is possible. And if data to be transmitted from an upper layer is generated, the UE may transmit non-IP data through a newly established/set SCEF connection (or NIDD configuration).

However, if an indicator representing availability of an SCEF connection (or NIDD configuration) or availability of non-IP data transmission is not included in the attach accept message, the UE may wait until the next mobile terminated call is received and may transmit a mobile originated call only when the mobile terminated call is received. This is so because reception of a mobile terminated call indicates that there currently exists a valid SCEF connection (or NIDD configuration).

Meanwhile, to provide additional descriptions in association with the step 15, if there is no valid SCEF connection (or NIDD configuration), to which SCS/AS the SCEF establishes/sets an SCEF connection (or NIDD configuration) may be determined according to various embodiments.

In one embodiment, if an SCS/AS ID (or address) corresponding to the UE and external ID information corresponding thereto are stored in the HSS as subscription information, the UE may query the information related to the SCEF connection of the UE from the HSS at the time of network attachment. In this case, if the UE or the MME queries the SCEF connection-related information to the HSS, the HSS may transmit the SCS/AS ID and the external ID stored as additional information to the SCEF when SCEF connection setup is requested to the SCEF. At this time, if there exists no valid SCEF connection (or NIDD configuration), the SCEF may request the SCS/AS corresponding to the SCS/AS ID received from the MME to establish an SCEF connection (or NIDD configuration) by using an external ID received.

On the other hand, if the MME does not particularly query the SCEF connection-related information to the HSS, the SCEF connection-related information may be requested separately to the HSS or the corresponding information may be stored/set in the SCEF in advance.

In other words, to summarize the flow diagram shown in FIG. 20, in the attach procedure, when the data transmission type included in the attach request message transmitted from the UE is non-IP type, the MME may determine whether to perform the SCEF connection and/or whether to establish/set the SCEF connection (or NIDD configuration). If it is determined that the SCEF connection is required to be established/set and/or if the SCEF connection has not been established/set, the MME may inform the HSS of the necessity for the SCEF connection. Accordingly, the HSS may check the SCS/AS ID of the corresponding UE, derive an external identifier relevant to the IMSI value of the UE, and request a target SCEF to set up the SCEF connection. At this time, the HSS may inform the SCEF of both of the SCS/AS ID and the external ID. Next, the SCEF may determine on the basis of the information from the HSS whether an available SCEF connection (or NIDD configuration) has been currently established/set, set/establish a new SCEF connection (or NIDD configuration) according to the determination result, or inform of existence of the SCEF connection (or NIDD configuration) already set/established.

FIG. 21 is a flow diagram illustrating an attach procedure for an SCEF connection according to a second embodiment of the present invention. Regarding the present flow diagram, descriptions given with reference to FIGS. 7, 17, and 20 may be applied in the same or in a similar manner; therefore, repeated descriptions will be omitted.

1. When making an attach request, the UE transmits an attach request message to the network by including indication information indicating that non IP-type data is to be transmitted, CIoT User Plane (UP) capability information, or CIoT Control Plane (CP) capability information therein.

2 to 7. Next, the legacy attach procedure described with reference to FIG. 7 may be performed. In other words, the steps 2 to 7 of FIG. 7 may be performed in place of the present steps of 2 to 7.

8. If no valid MM context of the UE exists on the network or the MME is attached to a new PLMN, the MME transmits an update location request (ULR) message (which registers a serving node of the UE) to the HSS. In this case, the MME may transmit the ULR message by including therein an indicator indicating that setup of a non-IP data path is required.

8a. If the HSS receives the ULR message and determines that non-IP data setup (or SCEF connection/NIDD configuration) is required, the HSS may infer an SCEF node that may serve by checking/using the SCS/AS ID stored with respect to the UE and check whether a service of the SCS/AS is available for the corresponding UE. At this time, the HSS may determine whether non-IP data setup (or SCEF connection/NIDD configuration) is required by checking existence of a valid SCEF connection (or NIDD configuration), the number of remaining NIDD transmissions, and so on.

If the HSS determines that the SCS/AS service for the corresponding UE is currently unavailable (namely if the HSS determines that an SCEF connection setup is required since there exists no valid SCEF connection (or NIDD configuration)), the HSS transmits an SCEF connection (setup) request to the SCEF through the step 8b. At this time, the SCEF to which the HSS transmits an SCEF connection (setup) request corresponds to an SCEF node that may serve the UE inferred previously.

8b. The HSS transmits the SCEF connection (setup) request to a destination SCEF. The SCEF connection (setup) request currently transmitted may include an external ID of the UE and the SCS/AS ID.

8c. The SCEF transmits an SCEF connection (setup) request including the external ID of the UE to the destination SCS/AS corresponding to the received SCS/AS ID.

A. If receiving the SCEF connection (setup) request of the step 8c, the SCS/AS may perform the NIDD configuration procedure described with reference to FIGS. 17.

9 to 10. Next, the step 9 and 10 of the legacy attach procedure described with reference to FIG. 7 may be performed.

11. If the SCEF connection (or NIDD configuration) is performed/completed successfully, the HSS may transmit SCEF connection information (or NIDD configuration information) to the MME through an update location response message instead of the existing insert subscription data request message. Here, the SCEF connection information, as the information about the SCEF connection (or NIDD configuration) performed/completed, may include an indicator indicating availability of the SCEF connection (or NIDD configuration)/non-IP data transmission, SCEF ID, SCEF reference ID, the maximum number of NIDD, NIDD duration, SCEF reference ID for deletion and/or chargeable party identifier. In this case, the steps 10 to 12 of the NIDD setup procedure which may be applied to the present flow diagram may be omitted.

12 and 13. If the MME receives SCEF connection information (or NIDD configuration information) and determines that non-IP data transmission for the UE is possible, the MME may transmit an attach accept message including an indicator indicating availability of the SCEF connection (or NIDD configuration)/non-IP data transmission to the UE through the eNB.

In other words, to summarize the flow diagram of FIG. 21, in the attach procedure of a UE, the ULR message transmitted to the HSS to register a serving node of the corresponding UE may include an indicator indicating necessity of an SCEF connection (or NIDD configuration) of the corresponding UE. The indicator indicating necessity of the SCEF connection (or NIDD configuration) may be interpreted such that non-IP data transmission is required. The HSS determines whether the corresponding UE requires the SCEF connection (on the basis of existence of an available SCEF connection (or NIDD configuration) and the number of remaining NIDD transmissions, for example) and if required, informs the SCEF that an SCEF connection (or NIDD configuration) for the corresponding UE is required. In the case of the present embodiment, to inform of the necessity of SCEF connection setup, the UE may transmit an ULR message to the HSS even when registration of a serving node is not required.

Meanwhile, although not shown in the flow diagram, different from the embodiments of FIGS. 20 and 21, the SCS/AS itself may directly request monitoring of the UE. However, since the SCS/AS does not know in advance whether the UE is attached, if the HSS receives the monitoring request from the SCS/AS, the HSS may store configuration information about monitoring of the UE requested by the SCS/AS and transmit the corresponding configuration information to the MME if the UE is attached to the network.

However, when another UE is deployed additionally, the SCS/AS may not be able to perform an SCEF connection (or NIDD configuration) required for the corresponding UE because the UE is not associated with the SCS/AS providing a service. Accordingly, a function which informs the SCS/AS of whether a UE has been attached to the network, namely whether the UE is able to establish an SCEF connection (or NIDD configuration) may be required. Therefore, if the MME determines that whether a UE has been attached (or exists) is required to be informed to the SCS/AS when the corresponding UE attempts to be attached (for example, the case when a new UE not associated with the SCS/AS requests to be attached), the MME may transmit an ULR message for the attach procedure described in detail with reference to FIG. 7 to the HSS by including indication information (for example, SCEF ID, SCS/AS ID, and external ID) into the ULR message. In this case, the HSS may transmit an indicator indicating attachment/availability of the UE to the SCS/AS through the SCEF together with serving node information. The SCS/AS which has received the corresponding indication may recognize attachment of the corresponding UE without a separate query to the HSS and perform setting up monitoring of an SCEF connection (or NIDD configuration) for the corresponding UE.

FIG. 22 is a flow diagram illustrating a procedure for setting NIDD configuration according to one embodiment of the present invention. Regarding the present flow diagram, descriptions given above and embodiments may be applied in the same or in a similar manner; therefore, repeated descriptions will be omitted.

First, the SCEF may receive a first SCEF connection setup request for non-IP data transmission of the UE from a network node S2210. Here, the first SCEF connection setup request may include an external identifier of the UE which has requested attachment and an SCS/AS identifier for the SCS/AS which provides a service for the UE. The external identifier of the UE may correspond to the IMSI of the UE, and the SCS/AS ID may be stored in the HSS as subscription information of the UE.

Next, the SCEF may determine whether NIDD configuration in conjunction with the SCS/AS has been established S2220. If it is determined from the S2220 step that the NIDD configuration has not been established, the SCEF may transmit a second SCEF connection setup request for establishing the NIDD configuration to the SCS/AS S2230. At this time, the second SCEF connection setup request may include the external identifier of the UE.

Lastly, the SCEF may set the NIDD configuration for the SCS/AS and the UE. More specifically, the SCEF may receive a first NIDD configuration request message requesting setting the NIDD configuration in conjunction with the UE from the SCS/AS and transmit a second NIDD configuration request message for setting the NIDD configuration to the HSS on the basis of the received first NIDD configuration request message. Here, the first and the second NIDD configuration request messages may include an SCS/AS identifier for the SCS/AS, SCS/AS reference identifier, the maximum number of NIDD, NIDD duration and/or NIDD destination address.

After the NIDD configuration is set, the SCEF may receive a first MO NIDD indication message informing of transmission of mobile originated data as non-IP data and a second MO NIDD indication message to the SCS/AS. At this time, the first and the second MO NIDD indication messages may include the SCEF reference identifier and mobile originated data. Furthermore, the SCEF may receive a first MO NIDD Acknowledge (Ack) message as a response to the second MO NIDD indication message and transmits a second MO NIDD Ack message as a response to the first MO NIDD indication message.

Alternatively, after the NIDD configuration is set, the SCEF may receive a first MT NIDD request message informing of transmission of a mobile terminated data as non-IP data from the SCS/AS and transmit a second MO NIDD request message. At this time, the first and the second MO NIDD request messages may include an SCEF reference identifier and mobile terminated data. Furthermore, the SCEF may receive a second MT NIDD response message as a response to the second MT NIDD request message and transmit a first MT NIDD response message as a response to the first MT NIDD request message. At this time, when the MME determines that it is impossible to transmit mobile terminated data, the second MT NIDD response message may include a cause value indicating the cause why transmission is impossible.

In addition, the NIDD configuration procedure described in detail with reference to FIG. 17 may be applied to the overall procedure for NIDD configuration.

Meanwhile, the network node of the S2210 step may correspond to the HSS or the MME.

If the network node corresponds to the MME, and an SCEF delivery method for non-IP data transmission is selected according as the MME determines to support non-IP data transmission through the control plane of the UE, the first SCEF connection setup request may be received from the MME.

Also, if the network node corresponds to the HSS, and the HSS determines that NIDD configuration for non-IP data transmission is required through an ULR message, the first SCEF connection setup request may be received from the HSS.

Device to which the present invention may be applied in general

FIG. 23 illustrates a block diagram of a communication device according to one embodiment of the present invention.

Referring to FIG. 23, a wireless communication system comprises a network node 2310 and a plurality of UEs 2320.

The network node 2310 comprises a processor 2311, memory 2312, and communication module 2313. The processor 2311 implements the functions, processes and/or methods described with reference to FIGS. 1 to 22. Layers of a wired/wireless interface protocol may be implemented by the processor 2311. The memory 2312, being connected to the processor 2311, stores various kinds of information to operate the processor 2311. The communication module 2313, being connected to the processor 2311, transmits and/or receives a wired/wireless signal. One example of the network node 2310 may include an eNB, MME, HSS, SGW, PGW, SCEF, and SCS/AS. In particular, when the network node 2310 corresponds to the eNB, the communication module 2313 may include a Radio Frequency (RF) unit for transmitting/receiving a radio signal.

The UE 2320 comprises a processor 2321, memory 2322, and communication module (or RF unit) 2323. The processor 2321 implements the functions, processes and/or methods described with reference to FIGS. 1 to 22. Layers of a wireless interface protocol may be implemented by the processor 2321. The memory 2322, being connected to the processor 2321, stores various kinds of information to operate the processor 2321. The communication module 2323, being connected to the processor 2321, transmits and/or receives a radio signal.

The memory 2312, 2322 may be installed inside or outside the processor 2311, 2321 and may be connected to the processor 2311, 2321 via various well-known means. Also, the network node 2310 (in the case of eNB) and/or the UE 2320 may be equipped with a single antenna or multiple antennas.

FIG. 24 illustrates a block diagram of a communication device according to one embodiment of the present invention.

In particular, FIG. 24 provides more detailed illustration of the UE described with reference to FIG. 23.

Referring to FIG. 24, the UE includes a processor (or digital signal processor) 2410, RF module (RF unit) 2435, power management module 2405, antenna 2440, battery 2455, display 2415, keypad 2420, memory 2430, Subscriber Identification Module (SIM) card 2425 (which may be optional), speaker 2445 and microphone 2450. The UE may include a single antenna or multiple antennas.

The processor 2410 may be configured to implement the functions, procedures and/or methods proposed by the present invention as described in FIG. 1-23. Layers of a wireless interface protocol may be implemented by the processor 2410.

The memory 2430 is connected to the processor 2410 and stores information related to operations of the processor 2410. The memory 2430 may be located inside or outside the processor 2410 and may be connected to the processors 2410 through various well-known means.

A user enters instructional information, such as a telephone number, for example, by pushing the buttons of a keypad 2420 or by voice activation using the microphone 2450. The microprocessor 2410 receives and processes the instructional information to perform the appropriate function, such as to dial the telephone number. Operational data may be retrieved from the SIM card 2425 or the memory module 2430 to perform the function. Furthermore, the processor 2410 may display the instructional and operational information on the display 2415 for the user's reference and convenience.

The RF module 2435 is connected to the processor 2410, transmits and/or receives an RF signal. The processor 2410 issues instructional information to the RF module 2435, to initiate communication, for example, transmits radio signals comprising voice communication data. The RF module 2435 comprises a receiver and a transmitter to receive and transmit radio signals. An antenna 2440 facilitates the transmission and reception of radio signals. Upon receiving radio signals, the RF module 2435 may forward and convert the signals to baseband frequency for processing by the processor 2410. The processed signals would be transformed into audible or readable information outputted via the speaker 2445.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. Software code may be stored in a memory unit and executed by a processor. The memory unit may be located at the interior or exterior of the processor and may transmit data to and receive data from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applied to a 3GPP LTE/LTE-A system is primarily described, but can be applied to various wireless communication systems in addition to the 3GPP LTE/LTE-A system.

The invention claimed is:

1. A method for a Service Capability Exposure Function (SCEF) in a wireless communication system to set a Non-IP Data Delivery (NIDD) configuration, the method comprising:

receiving, from a network node, a first SCEF connection setup request for a non-IP data transmission of a user equipment (UE), wherein the first SCEF connection setup request comprises an external identifier of the UE and a Services Capability Server (SCS)/Application Server (AS) identifier (ID) of an SCS/AS which provides a service for the UE;

determining whether the NIDD configuration for the SCS/AS is established;

when the NIDD configuration is not established:

transmitting a second SCEF connection setup request for establishing the NIDD configuration to the SCS/AS, wherein the second SCEF connection setup request comprises the external identifier of the UE; and setting the NIDD configuration for the SCS/AS and the UE.

2. The method of claim 1, wherein the external identifier of the UE corresponds to an International Mobile Subscriber Identity (IMSI) of the UE, and the SCS/AS ID is stored in a Home Subscriber Server (HSS) as subscriber information of the UE.

3. The method of claim 1, wherein the network node corresponds to a Home Subscriber Server (HSS) or a Mobility Management Entity (MME).

4. The method of claim 3, wherein, when the network node corresponds to the MME and an SCEF delivery method for the non-IP data transmission is selected as the MME determines to support the non-IP data transmission through control plane of the UE, the first SCEF connection setup request is received from the MME.

5. The method of claim 3, wherein, when the network node corresponds to the HSS and the HSS determines that the NIDD configuration for the non-IP data transmission is required through an Update Location Request (ULR) message, the first SCEF connection setup request is received from the HSS.

6. The method of claim 1, wherein the setting the NIDD configuration comprises:

receiving, from the SCS/AS, a first NIDD configuration request message requesting setting the NIDD configuration with the UE; and transmitting, to a Home Subscriber Server (HSS), a second NIDD configuration request message for setting the NIDD configuration based on the first NIDD configuration request message received,
wherein the first and second NIDD configuration request messages include an SCS/AS identifier for the SCS/AS and SCS/AS reference identifier, a maximum number of NIDD, NIDD duration and/or NIDD destination address.

7. The method of claim 6, further comprising:
receiving a first Mobile Oriented (MO) NIDD indication message notifying of transmission of MO data as the non-IP data after the NIDD configuration is set; and
transmitting a second MO NIDD indication message to the SC S/AS,
wherein the first and second MO NIDD indication messages comprise the SCEF reference identifier and the MO data.

8. The method of claim 7, further comprising:
receiving a first MO NIDD Acknowledge (Ack) message in response to the second MO NIDD indication message; and
transmitting a second MO NIDD Ack message in response to the first MO NIDD indication message.

9. The method of claim 1, further comprising:
receiving a first Mobile Terminated (MT) NIDD request message notifying of transmission of MT data as the non-IP data from the SCS/AS after the NIDD configuration is set; and
transmitting a second MO NIDD request message,
wherein the first and second MO NIDD request messages comprise the SCEF reference identifier and the MT data.

10. The method of claim 9, further comprising:
receiving a second MT NIDD response message in response to the second MT NIDD request message; and
transmitting a first MT NIDD response message in response to the first MT NIDD request message,
wherein, when a Mobility Management Entity (MME) determines that a transmission of the MT data is impossible, the second MT NIDD response message comprises a cause value indicating a reason why the transmission is impossible.

11. A Service Capability Exposure Function (SCEF) for setting a Non-IP Data Delivery (NIDD) configuration in a wireless communication system, the SCEF comprising:
a transmitter configured to transmit a signal;
a receiver configured to receive a signal; and
a processor configured to control the transmitter and the receiver,
wherein the processor is further configured to:
receive, from a network node, a first SCEF connection setup request for a non-IP data transmission of a user equipment (UE), wherein the first SCEF connection setup request comprises an external identifier of the UE and a Services Capability Server (SCS)/Application Server (AS) identifier (ID) of an SCS/AS which provides a service for the UE;
determine whether the NIDD configuration for the SCS/AS is established;
when the NIDD configuration is not established:
transmit a second SCEF connection setup request for establishing the NIDD configuration to the SCS/AS, wherein the second SCEF connection setup request comprises the external identifier of the UE; and
set the NIDD configuration for the SCS/AS and the UE.

12. The SCEF of claim 11, wherein the external identifier of the UE corresponds to an International Mobile Subscriber Identity (IMSI) of the UE, and the SCS/AS ID is stored in a Home Subscriber Server (HSS) as subscriber information of the UE.

13. The SCEF of claim 11, wherein the network node corresponds to a Home Subscriber Server (HSS) or a Mobility Management Entity (MME).

14. The SCEF of claim 13, wherein, when the network node corresponds to the MME and an SCEF delivery method for the non-IP data transmission is selected as the MME determines to support the non-IP data transmission through control plane of the UE, the first SCEF connection setup request is received from the MME.

15. The SCEF of claim 13, wherein, when the network node corresponds to the HSS and the HSS determines that the NIDD configuration for the non-IP data transmission is required through an Update Location Request (ULR) message, the first SCEF connection setup request is received from the HSS.

* * * * *